United States Patent
Mizumaki et al.

(10) Patent No.: US 6,710,563 B2
(45) Date of Patent: Mar. 23, 2004

(54) DRIVING DEVICE, LIGHT AMOUNT CONTROLLER AND SHUTTER

(75) Inventors: Masao Mizumaki, Kanagawa (JP); Chikara Aoshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/093,453

(22) Filed: Mar. 11, 2002

(65) Prior Publication Data

US 2002/0127013 A1 Sep. 12, 2002

(30) Foreign Application Priority Data

| Mar. 12, 2001 | (JP) | 2001-068273 |
| May 11, 2001 | (JP) | 2001-141412 |
| Jul. 9, 2001 | (JP) | 2001-207258 |

(51) Int. Cl.[7] ............................................. H02K 23/16
(52) U.S. Cl. .................. 318/437; 318/685; 318/696; 318/640; 318/254; 310/49; 359/227; 359/230
(58) Field of Search .......................... 318/685, 696, 318/640, 437, 254; 310/49; 359/227, 230

(56) References Cited

U.S. PATENT DOCUMENTS

| 3,508,091 | A | * | 4/1970 | Kavanaugh | 310/49 R |
| 3,551,711 | A | * | 12/1970 | Davis | 310/43 |
| 4,656,381 | A | * | 4/1987 | Komatsu | 310/257 |
| 4,891,567 | A | * | 1/1990 | Fujitani et al. | 318/254 |
| 5,298,820 | A | * | 3/1994 | Lee et al. | 310/40 MM |
| 5,369,324 | A | * | 11/1994 | Saether | 310/49 R |
| 5,384,506 | A | * | 1/1995 | Aoshima | 310/49 R |
| 5,523,815 | A | * | 6/1996 | Tamura | 396/508 |
| 5,555,059 | A | * | 9/1996 | Seo et al. | 396/463 |
| 5,831,356 | A | | 11/1998 | Aoshima | 310/49 R |
| 5,917,303 | A | * | 6/1999 | Depatie et al. | 318/685 |
| 6,218,753 | B1 | * | 4/2001 | Asano et al. | 310/156.53 |
| 2002/0047313 | A1 | | 4/2002 | Aoshima | 310/10 |

FOREIGN PATENT DOCUMENTS

| JP | 53-2774 | 1/1978 |
| JP | 57-166847 | 10/1982 |
| JP | 7-213041 | 8/1995 |
| JP | 11-305285 | 11/1999 |
| JP | 2000-50601 | 2/2000 |
| JP | 2002-47313 | 2/2002 |

* cited by examiner

*Primary Examiner*—Rita Leykin
(74) *Attorney, Agent, or Firm*—Fitzpatrick, Cella, Harper & Scinto

(57) ABSTRACT

There is provided a small-sized and slim driving device which is easy to manufacture and capable of producing high output. A magnet has a cylindrical shape, and at least the outer peripheral surface of the magnet is circumferentially divided into n sections magnetized so as to have alternately different poles. The magnet can rotate about a rotational axis of the cylindrical shape. A coil is arranged axially of the magnet and parallel thereto. An outer magnetic pole portion is disposed to be magnetized by the coil, and has a plurality of hair comb tooth-shaped portions opposed to the magnet and arranged around the magnet such that an angle corresponding to the circumferential width of each of the hair comb tooth-shaped portions opposed to the magnet about the rotational axis of the hollow cylindrical shape of the magnet is equal to a predetermined angle A. An inner magnetic pole portion is disposed to be magnetized by the coil, and has a hollow cylindrical shape opposed to the inner peripheral surface of the magnet. The predetermined angle A is set to such a value that a rotational force acts on the magnet to return to a position in which a circumferential center of each of n magnetized sections on the outer peripheral surface of the magnet is opposed to a circumferential center of a corresponding one of the hair comb tooth-shaped portions of the outer magnetic pole portion, when the circumferential center of each of n magnetized sections shifts from the position.

22 Claims, 17 Drawing Sheets

DRIVING DEVICE, LIGHT AMOUNT CONTROLLER AND SHUTTER

BACKGROUND OF THE PRESENT INVENTION

1. Field of the Present Invention

The present invention relates to a driving device having an extremely compact size, and a light amount controller and a shutter using the driving device.

2. Description of the Related Art

Conventionally, motors that can be designed compact in size include a brushless motor. Brushless motors with simple driving circuits include a stepper motor, described below.

FIG. 17 shows an example of a small-sized hollow cylindrical stepper motor. The stepper motor includes two stators 102 each comprised of a bobbin 101 having a stator coil 105 concentrically wound thereon, two stator yokes 106 axially fixedly holding the bobbin 101 in a sandwiching fashion, the stator yokes 106 each having stator teeth 106a and 106b alternately arranged circumferentially of an inner peripheral surface of the bobbin 101, and a casing 103 to which are secured the stator yokes 106 formed integrally with the respective stator teeth 106a and 106b. One of the two casings 103 has a flange 115 and a bearing 108 fixed thereto, while the other casing 103 has another bearing 108 fixed thereto. A rotor 109 is comprised of a rotor magnet 111 rigidly fitted on a rotor shaft 110. The rotor magnet 111 defines radial gaps between the same and the stator yokes 106 of the stators 102. The rotor shaft 110 is rotatably supported by the two bearings 108 on opposite ends thereof.

A light controller using a variation of the stepper motor constructed as above has been proposed in Japanese Patent Publication (Kokoku) No. 53-2774. The light controller controls the quantity of passing light by opening and closing shutter blades connected to the stepper motor, in a stepwise fashion. Another variation is a hollow motor proposed in Japanese Laid-Open Patent Publication (Kokai) No. 57-166847. The hollow motor is a ring-shaped stepper motor which allows light to pass through a cavity formed in a central portion thereof.

There are known digital cameras of a kind which use a CCD or the like as an image pickup device for photoelectrically converting an object image to thereby record the image on a storage medium as information of a still image. The digital cameras of this kind include a type having a diaphragm blade and a shutter blade, and actuators for actuating the respective blades.

Operations related to exposure of the digital camera of the above-mentioned type are as follows.

First, when the main power supply is turned on to make the image pickup device operative before photographing, the shutter blade is held in its open position which allows the image pickup device to be exposed to light. The image pickup device repeatedly accumulates, discharges, and transfers electric charge to allow an object field to be observed on an image monitor. When a release button is depressed, a diaphragm value and an exposure time are determined according to an output from the image pickup device at this time point. Judging from the determined diaphragm value and exposure time, if it is necessary to reduce the diameter of an exposure aperture, first, the diaphragm blade is operated into a position providing a predetermined diaphragm value. Then, the image pickup device from which the stored electric charge has been discharged is caused to start storage or accumulation of electric charge in response to a storage start signal. At the same time, an exposure time control circuit is started in response to the storage start signal serving as a trigger signal, and when the lapse of the predetermined exposure time has been counted up, the shutter blade is actuated into a closed position for blocking light to the image pickup device. After the blocking of light to the image pickup device, the stored electric charge is transferred, whereby image information is recorded onto a storage medium via an image writing device. The exposure of the image pickup device is inhibited during the transfer of the electrical charge because it is necessary to prevent the charge from being changed by extra light.

Another type of digital camera has been proposed in Japanese Laid-Open Patent Publication (Kokai) No. 11-305285, in which a diaphragm blade and a shutter blade are driven by a single actuator. In this digital camera, the actuator can assume any of three states, i.e. a deenergized state, a normally energized state, and a reversely energized state. When the actuator is in the deenergized state, the camera is placed in an intermediate aperture state. When the actuator is in the normally energized state, the camera is placed in a maximum aperture state, while when the actuator is in the reversely energized state, the camera is placed in a fully closed state.

In the above conventional small-sized stepper motor shown in FIG. 17, however, the cases 103, the bobbins 101, the stator coils 105 and the stator yokes 106 are concentrically arranged around the rotor 109, which inevitably results in increased outer dimensions of the motor. Further, magnetic flux generated by energization of the stator coils 105 mainly flows between the end faces 106a1 of the stator teeth 106a and the end faces 106b1 of the stator teeth 106b as shown in FIG. 18, and hence the magnetic flux does not effectively act on the rotor magnet 111.

Similarly, the light controller proposed in Japanese Patent Publication (Kokoku) No. 53-2774 and the hollow motor proposed in Japanese Laid-Open Patent Publication (Kokai) 57-166847 each have stator coils and stator yokes arranged around a rotor magnet, so that the outer dimensions of the motor are increased, and magnetic flux generated by energization of the stator coils does not effectively act on the rotor magnet.

Further, a coin-shaped brushless motor as shown in FIG. 19 has been proposed e.g. in Japanese Laid-Open Patent Publications (Kokai) No. 7-213041 and No. 2000-50601. The brushless motor is comprised of a plurality of coils 301, 302, 303 and a disk-shaped magnet 304. As shown in FIG. 19, each of the coils has a thin coin-like shape, and is disposed such that the axis thereof extends parallel with that of the magnet. The disk-shaped magnet is magnetized in the axial direction thereof, and is disposed such that the magnetic surface (inner peripheral surface) of the magnet faces in a direction perpendicular to the axis of each of the coils.

In this motor, as illustrated by arrows in FIG. 20, magnetic flux generated by the coils cannot fully effectively act on the magnet. Further, the center of a rotational force or torque generated by the magnet is away from the outer periphery of the motor by a distance of L, so that the torque generated by the motor is small for the size of the motor. In addition, a central portion of the motor is occupied by the coils and the magnet, it is difficult to utilize this portion for some other purposes.

Further, some shutter devices for digital cameras have diaphragm blades and shutter blades incorporated therein. In view of costs and space, it is preferable that these blades are actuated by a single actuator. Japanese Laid-Open Patent Publication (Kokai) No. 11-305285 discloses a shutter device of this type in which a single actuator actuates a shutter blade which also serve as a diaphragm blade. However, in the shutter device, a magnetic neutral point thereof is utilized to control the position of the shutter blade for an intermediate aperture, which makes it difficult to operate the blade with high accuracy.

SUMMARY OF THE PRESENT INVENTION

It is a first object of the present invention to provide a small-sized and slim driving device which is easy to manufacture and capable of producing high output.

It is a second object of the present invention to provide a light amount controller using a small-sized and slim driving device which is easy to manufacture and capable of producing high output.

It is a third object of the present invention to provide a shutter using a small-sized and slim driving device which is capable of changing a diaphragm value and capable of producing high output.

It is a fourth object of the present invention to provide a shutter which is capable of holding its open state or closed state even when the device is not energized, thereby reducing power consumption.

To attain the first object, in a first aspect of the present invention, there is provided a driving device comprising a magnet having a hollow cylindrical shape and having an outer peripheral surface and an inner peripheral surface, at least the outer peripheral surface being circumferentially divided into n sections magnetized so as to have alternately different poles, the magnet being rotatable about a rotational axis of the hollow cylindrical shape thereof, a coil arranged axially of the magnet and parallel thereto, an outer magnetic pole portion disposed to be magnetized by the coil, the outer magnetic pole portion having a plurality of hair comb tooth-shaped portions opposed to the magnet and arranged around the magnet such that an angle corresponding to a circumferential width of each of the hair comb tooth-shaped portions opposed to the magnet about the rotational axis of the hollow cylindrical shape of the magnet is equal to a predetermined angle A, and an inner magnetic pole portion disposed to be magnetized by the coil, the inner magnetic pole portion having a hollow cylindrical shape opposed to the inner peripheral surface of the magnet, wherein the predetermined angle A is set to such a value that a rotational force acts on the magnet to return to a position in which a circumferential center of each of n magnetized sections on the outer peripheral surface of the magnet is opposed to a circumferential center of a corresponding one of the hair comb tooth-shaped portions of the outer magnetic pole portion, when the circumferential center of each of n magnetized sections shifts from the position.

To attain the second object, in a second aspect of the present invention, there is provided a light amount controller comprising a magnet having a hollow cylindrical shape and having an outer peripheral surface and an inner peripheral surface, at least the outer peripheral surface being circumferentially divided into n sections magnetized so as to have alternately different poles, the magnet being rotatable about a rotational axis of the hollow cylindrical shape thereof, a coil arranged axially of the magnet and parallel thereto, an outer magnetic pole portion disposed to be magnetized by the coil, the outer magnetic pole portion having a plurality of hair comb tooth-shaped portions opposed to the magnet and arranged around the magnet such that an angle corresponding to a circumferential width of each of the hair comb tooth-shaped portions opposed to the magnet about the rotational axis of the hollow cylindrical shape of the magnet is equal to a predetermined angle A, and an inner magnetic pole portion disposed to be magnetized by the coil, the inner magnetic pole portion having a hollow cylindrical shape opposed to the inner peripheral surface of the magnet, and a light amount control member which can be opened or closed in a manner interlocked to the magnet to thereby control an amount of light passing through the inner magnetic pole portion, wherein the predetermined angle A is set to such a value that a rotational force acts on the magnet to return to a position in which a circumferential center of each of n magnetized sections on the outer peripheral surface of the magnet is opposed to a circumferential center of a corresponding one of the hair comb tooth-shaped portions of the outer magnetic pole portion, when the circumferential center of each of n magnetized sections shifts from the position.

To attain the second object, in a third aspect of the present invention, there is provided a light amount controller comprising a magnet having a hollow cylindrical shape and having an outer peripheral surface and an inner peripheral surface, at least the outer peripheral surface being circumferentially divided into n sections magnetized so as to have alternately different poles, the magnet being rotatable about a rotational axis of the hollow cylindrical shape thereof, a coil arranged axially of the magnet and parallel thereto, an outer magnetic pole portion disposed to be magnetized by the coil, the outer magnetic pole portion having a plurality of hair comb tooth-shaped portions opposed to the magnet and arranged around the magnet such that an angle corresponding to a circumferential width of each of the hair comb tooth-shaped portions opposed to the magnet about the rotational axis of the hollow cylindrical shape of the magnet is equal to a predetermined angle A, and an inner magnetic pole portion disposed to be magnetized by the coil, the inner magnetic pole portion having a hollow cylindrical shape opposed to the inner peripheral surface of the magnet, a light amount control member which can be opened and closed in a manner interlocked to the magnet to thereby control an amount of light passing through the inner magnetic pole portion, and control means for controlling the light amount control member by switching a direction of energization of the coil such that the magnet is switched between a first state in which the magnet is held at a first rotational position by attractive forces of the magnet and the outer magnetic pole portion when the coil is deenergized and a second state in which the magnet is held at a second rotational position to which the magnet has been rotated through a predetermined angle from the first state, by attraction forces of the magnet and the outer magnetic pole portion when the coil is deenergized, wherein the predetermined angle A is set to such a value that a rotational force acts on the magnet to return to a position in which a circumferential center of each of n magnetized sections on the outer peripheral surface of the magnet is opposed to a circumferential center of a corresponding one of the hair comb tooth-shaped portions of the outer magnetic pole portion, when the circumferential center of each of n magnetized sections shifts from the position.

In the first to third aspects of the present invention, preferably, assuming that the magnet has an outer diameter of D1 and an inner diameter of D2, the predetermined angle A is set to satisfy a condition defined by an expression:

$$A < (248.4/n) - 58.86 \times (D1 - D2)/(D1 \times \pi).$$

In the first to third aspects of the present invention, preferably, each of the hair comb tooth shaped portions of the outer magnetic pole portion has an axial length larger than a height of the outer peripheral surface of the magnet.

In the first to third aspects of the present invention, preferably, the driving device or the light amount controller includes a light amount controller including a rotation-preventing member for limiting a rotational angle of the magnet.

In the first to third aspects of the present invention, preferably, the magnet is rotatable through a rotational angle range smaller than an angle corresponding to a circumferential length of each of the n sections having alternately different poles about the rotational axis of the hollow cylindrical shape of the magnet.

To attain the third and fourth objects, in a fourth aspect of the present invention, there is provided a shutter comprising a magnet having a hollow cylindrical shape and having an outer peripheral surface and an inner peripheral surface, at least the outer peripheral surface being circumferentially divided into n sections magnetized so as to have alternately different poles, the magnet being rotatable about a rotational axis of the hollow cylindrical shape thereof, a coil arranged axially of the magnet and parallel thereto, an outer magnetic pole portion opposed to the outer peripheral surface of the magnet, to be magnetized by the coil, an inner magnetic pole portion having a hollow cylindrical shape opposed to the inner peripheral surface of the magnet, to be magnetized by the coil, a shutter blade interlocked with the magnet for moving between a closing position for closing an optical path formed by an inside of the hollow cylindrical shape of the inner magnetic pole portion and an opening position for holding the optical path in an open state, and light amount-adjusting means for changing an amount of light passing through the optical path in a manner interlocked with rotation of the magnet.

Preferably, the light amount-adjusting means comprises a one-way clutch having an input side thereof connected to the magnet, and an output side, for transmitting only a rotational force of the magnet in a predetermined direction to the output side thereof, and a light amount-adjusting member connected to the output side of the one-way clutch for entering into or retracting from the optical path in a manner interlocked to motion of the output side of the one-way clutch to thereby change the amount of light passing through the optical path.

Preferably, assuming that the n sections of the outer peripheral surface of the magnet have n alternately different poles, the outer magnetic pole portion opposed to the outer peripheral surface of the magnet has a shape of a plurality of hair comb tooth-shaped portions arranged circumferentially at equal intervals of an integral number of times as large as 720/n degrees around the outer peripheral surface of the magnet, each of the hair comb tooth-shaped portions of the outer magnetic pole portion opposed to the outer peripheral surface of the magnet having a circumferential width corresponding to a predetermined angle A about a rotational axis of the hollow cylindrical shape of the magnet, the predetermined angle A being set to such a value that a rotational force acts on the magnet to return to a position in which a circumferential center of each of n magnetized sections on the outer peripheral surface of the magnet is opposed to a circumferential center of a corresponding one of the hair comb tooth-shaped portions of the outer magnetic pole portion, when the circumferential center of each of n magnetized sections shifts from the position.

In the fourth aspect of the present invention, preferably, assuming that the magnet has an outer diameter of D1, and an inner diameter of D2, the predetermined angle A is set to satisfy a condition defined by the following expression:

$$A < (248.4/n) - 58.86 \times (D1-D2)/(D1 \times \pi).$$

According to the first to third aspects, the outer diameter of the driving device is determined by the outer magnetic pole portion opposed to the outer peripheral surface of the magnet, the inner diameter of the driving device is determined by the inner magnetic pole portion opposed to the inner peripheral surface of the magnet, and the axial height of the driving device is determined by the axial arrangement of the coil and the magnet. As a result, it is possible to largely reduce the size of the driving device. Further, the magnetic flux generated between the outer magnetic pole pieces and the inner magnetic pole portion magnetized by excitation of the coil crosses the magnet arranged between the magnetic pole pieces and member, and hence effectively acts on the magnet.

Furthermore, assuming that the angle corresponding to the circumferential width of each hair comb tooth-shaped portion of the outer magnetic pole portion opposed to the magnet about the rotational axis of the hollow cylindrical shape of the magnet is equal to the predetermined angle A, and the magnet has n magnetized poles, an outer diameter of D1 and an inner diameter of D2, the value A is set to satisfy the condition defined by the expression of $A < (248.4/n) - 58.86 \times (D1-D2)/(D1 \times \pi)$ holds. Therefore, when the coil is not energized, the center of each magnetized pole of the magnet can be stably held at a position opposed to the center of a corresponding hair comb tooth-shaped portion of the outer magnetic pole portion.

Moreover, since each comb hair tooth-shaped portion of the outer magnetic pole portion is configured to have an axial length larger than the height of the outer peripheral surface of the magnet, a force axially exerted on the magnet by the outer magnetic pole portion and the inner magnetic pole portion is reduced. As a result, sliding friction between the magnet and members holding the magnet in the axial direction is reduced, which enables smooth rotation of the magnet.

Further, the light amount controller according to the second and third aspects of the present invention includes the above driving device, and the light amount control member connected to the magnet of the driving device, for pivotal motion for control of the amount of light passing through the inside of the hollow cylindrical inner magnetic pole portion, it is possible to allow light to pass through the central portion of the driving device.

According to the third aspect of the present invention, it is possible to switch the light amount control between two states by switching the direction of energizing the coil. Further, when the coil is deenergized, the magnet is held at either of the two states. Thus, even if the coil is not energized, the light amount control member is prevented from being moved due to a shock or the like, which makes it possible to enhance reliability of the light amount controller and reduce power consumption.

Further, according to the fourth aspect, since the outer diameter of the motor is determined by the outer magnetic pole piece opposed to the outer peripheral surface of the magnet, and the axial length of the motor is determined by the axial arrangement of the coil and the magnet, it is possible to largely reduce the size of the driving device. In addition, magnetic flux generated by the outer and inner magnetic pole portions by excitation of the coil crosses the magnet arranged therebetween, and hence effectively acts on the magnet.

Moreover, according to the arrangement that the shutter is provided with shutter blades and the light amount control member, which are connected to the magnet for pivotal motion, the shutter can be configured such that light is allowed to pass through the central portion of the driving device.

Further, since the light amount-adjusting means is operated in a manner interlocked with rotation of the magnet, for changing the amount of light passing through the optical path, the shutter can have a plurality of diaphragm values.

Furthermore, according to the arrangement that the shutter has light amount control means that takes out only rotation of the magnet in one direction to thereby change the amount of light passing through the optical path, it is possible to carry out an operation for changing the diaphragm value and an operation for opening/closing the shutter by a single actuator, which contributes to reduction of the size thereof. In addition, by rotating the magnet alternately in normal and reverse directions before exposure for actually capturing an image onto a recording medium, the light amount-adjusting means can be selectively driven into a plurality of light amount control states according to the number of times of the rotation.

The above and other objects, features, and advantages of the present invention will become more apparent from the following detailed description taken in conjunction with the accompany with drawings.

DETAILED DESCRIPTION OF THE PREFERRED EMBODIMENTS

The present invention will now be described in detail with reference to the drawings showing embodiments thereof.

Figure 1:
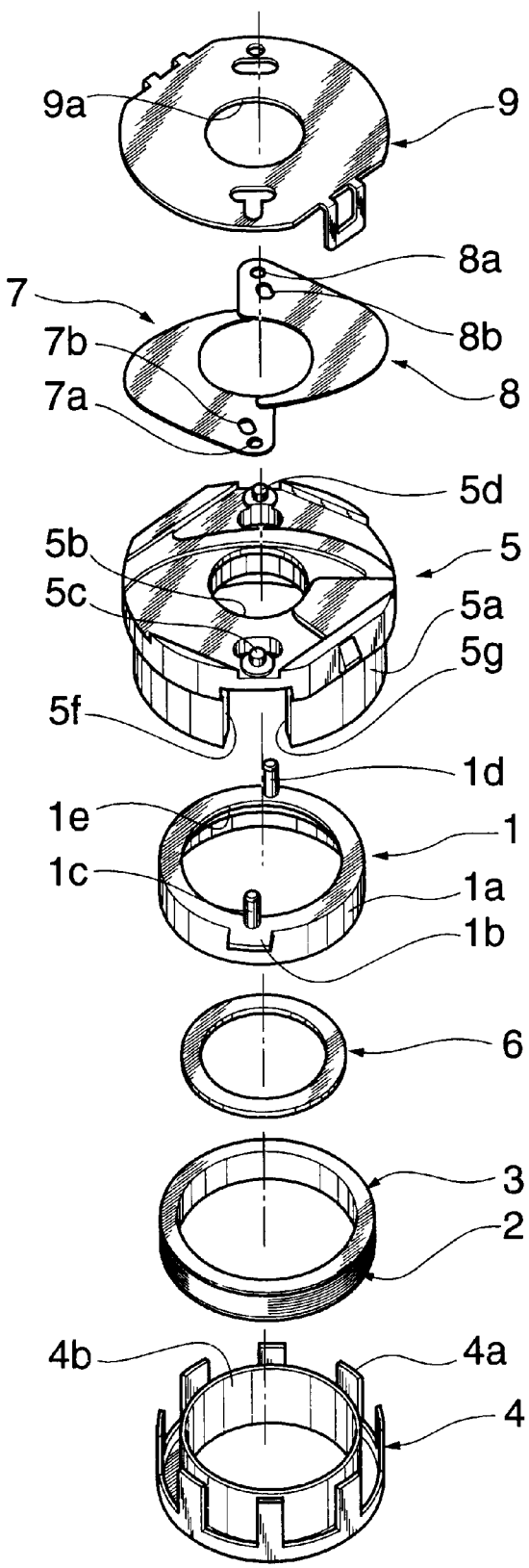
FIG. 1 is an exploded perspective view of a light amount controller equipped with a driving device according to a first embodiment of the present invention.
Figure 2:
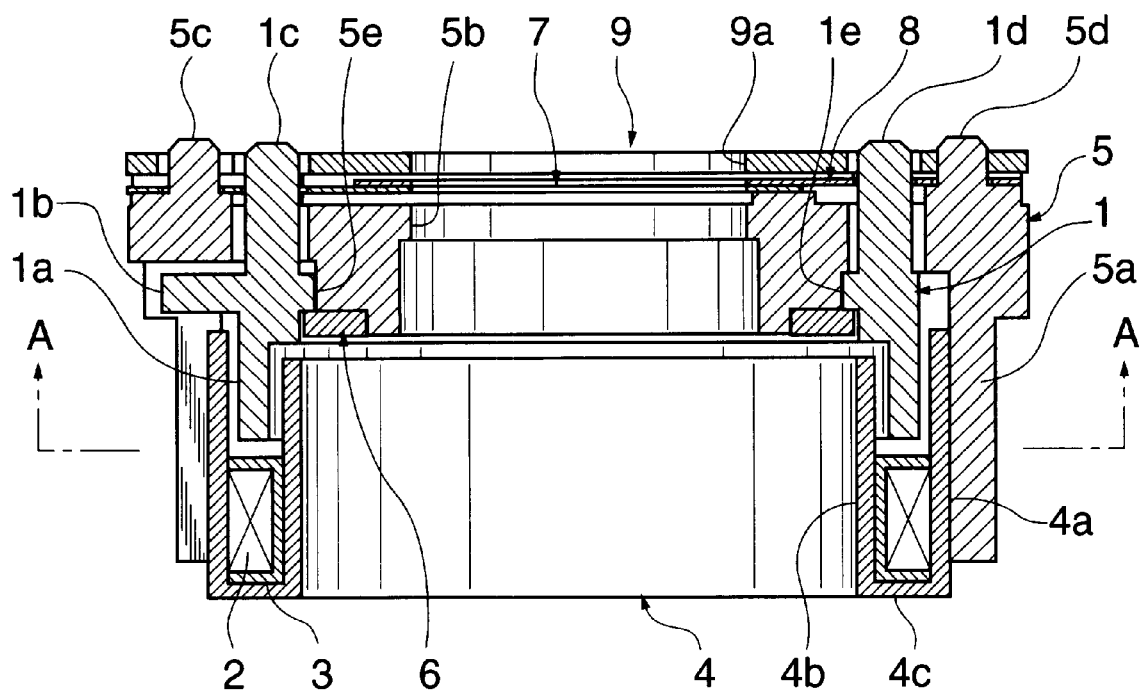
FIG. 2 is an axial cross-sectional view showing an assembled state of the light amount controller of FIG. 1.
Figure 3A:
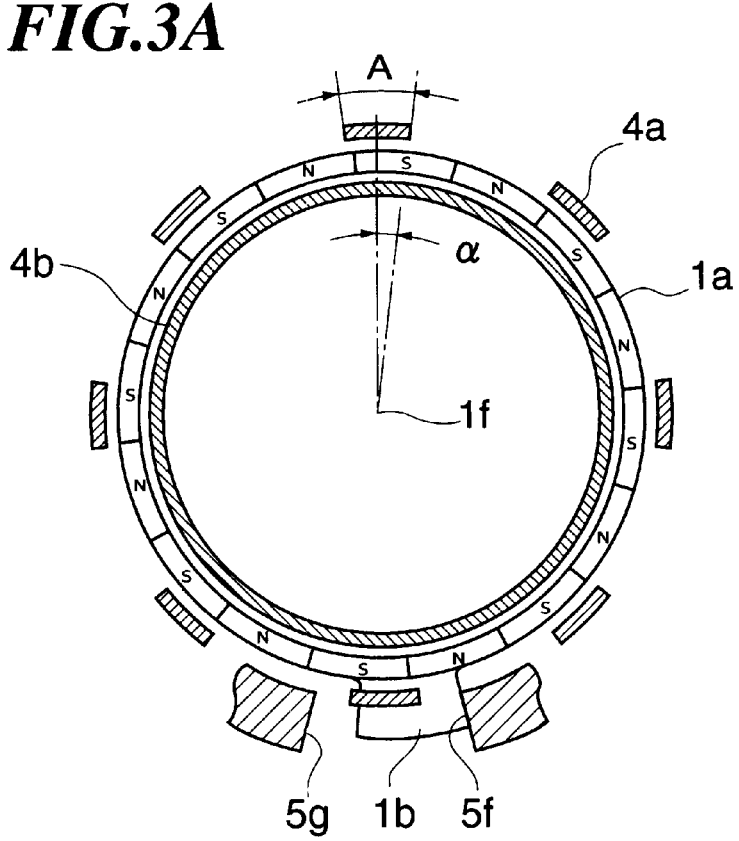
FIG. 3A is a transverse cross-sectional view showing a state in which a projection 1b of a magnet 1 appearing in FIG. 1 is in abutment with a stopper portion 5f of a base board 5.
Figure 3B:
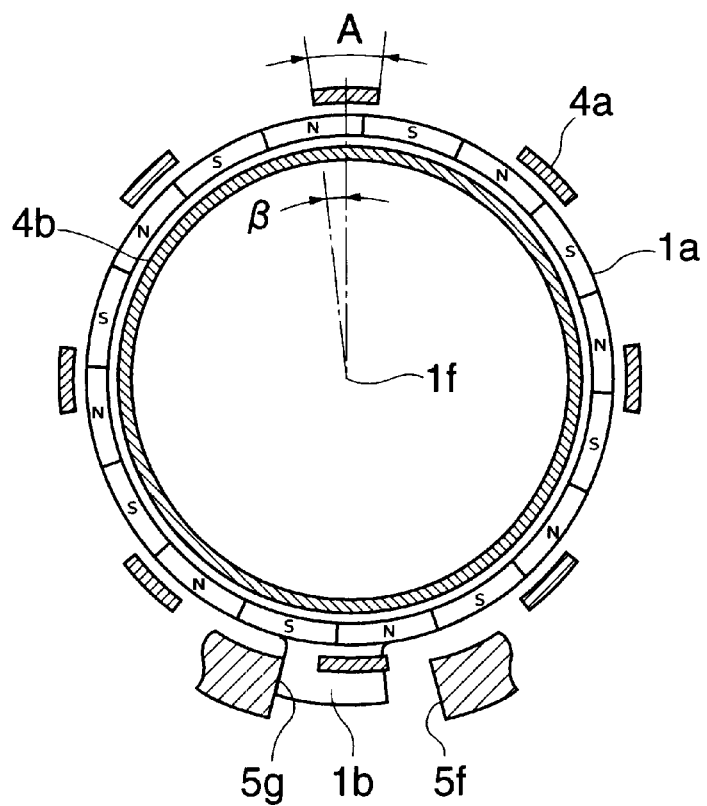
FIG. 3B is a transverse cross-sectional view showing a state in which the projection 1b of the magnet 1 appearing in FIG. 1 is in abutment with a stopper portion 5g of the base board 5.

FIGS. 1 to 3B show a light amount controller according to a first embodiment of the present invention. FIG. 1 is an exploded perspective view of the light amount controller equipped with a driving device according to the first embodiment. FIG. 2 is an axial cross-sectional view of an assembled state of the light amount controller equipped with the driving device shown in FIG. 1, while FIGS. 3A, 3B are cross-sectional views taken on line A—A of FIG. 2, which are useful in explaining rotating operations of a magnet of the driving device.

In FIGS. 1 to 3B, reference numeral 1 designates a hollow cylindrical magnet forming a rotor. As shown in FIG. 3A, the magnet 1 has a magnetized portion 1a which is formed by circumferentially dividing the magnet 1 into n sections (sixteen sections in the present embodiment) and permanently magnetizing the n sections such that they alternately have an S pole and an N pole along the outer peripheral side. Although in FIGS. 3A and 3B, the magnetized portion 1a is represented by the outer peripheral side portion, actually, the magnetized portion 1a has an inner peripheral side portion having respective sections corresponding to the above n sections and having opposite poles to the respective poles of the n sections of the outer peripheral side portion. The magnet 1 is formed by injection molding a plastic magnet material, which allows the hollow cylinder (particularly, the magnetized portion 1a) to have a very small radial thickness. Further, the magnet 1 is formed integrally with a projection 1b for limiting rotation of the magnet 1, dowels 1c and 1d projecting in the axial direction, and an engaging portion 1e slightly protruding toward the central opening of the magnet 1. The magnet 1 is rotatably supported by a base board 5, described hereinafter, in such a manner that the engaging portion 1e is slidably engaged with an engaging portion 5e of the base board 5.

Since the magnet 1 is formed by injection molding of plastic magnet material formed as described above, it can be easily manufactured despite its complicated shape having the projection 1b, the dowels 1c and 1d, and the engaging portion 1e. Further, since the magnet 1 has the engaging portion 1e formed integrally therewith, the accuracy of concentricity of the engaging portion 1e and the magnet main body with respect to the rotational axis thereof is enhanced, which makes it possible to reduce shaking of the rotor and decrease a gap between the magnetized portion 1*a* and a stator 4, referred to hereinafter, to thereby ensure sufficient output torque. Moreover, the injection molding of the magnet provides a thin resin film formed on the surfaces of the magnet, so that the amount of rust generated on the injection molded magnet is far smaller than that generated on a compression molded magnet, which makes it possible to omit rustproof treatment such as coating. In addition, the injection molded magnet is free of adherence of magnetic powder or surface swelling which is apt to occur during rustproof treatment, which is inherent in a compression molded magnet, leading to improved product quality.

The plastic magnet used as the magnet 1 is formed by injection molding a mixture of Nd—Fe—B-based rare earth magnetic powder and a thermoplastic resin binder such as polyamide. While a magnet formed by compression molding has a bending strength of about 500 Kgf/cm$^2$, the use of polyamide resin as the binder material, for example, can obtain a bending strength of not less than 800 Kgf/cm$^2$, and as a result, the magnet 1 can be formed into a thin-wall hollow cylindrical shape, which could not be achieved by compression molding. The thin-wall hollow cylindrical shape of the magnet 1 thus formed enables a reduction in the gap or distance between an outer magnetic pole and an inner magnetic pole of the stator 4, described hereinbelow, thereby making it possible to form a magnetic circuit having a small magnetic resistance therebetween. Thus, when a coil 2, referred to hereinafter, is energized, an increased amount of magnetic flux can be generated with a small magnetomotive force, which enhances the performance of the actuator.

The coil 2, which is in the form of a hollow cylinder, is wound on a bobbin 3 formed of an insulating material. The coil 2 is arranged concentric and axially parallel with the magnet 1. The outer diameter of the coil 2 is approximately equal to that of the magnet 1.

The stator 4 is formed of a soft magnetic material and comprised of an outer hollow cylinder (outer magnetic pole), an inner hollow cylinder inner magnetic pole) and a connecting portion 4*c* connecting the hollow cylinders. The outer hollow cylinder of the stator 4 is formed at one end thereof with a plurality of teeth each extending in the axial direction, i.e. presenting a hair comb shape. The number of the axially extending teeth is half the number n of the sections of the magnetized portion 1*a* of the magnet 1 (i.e. eight in the present embodiment). These teeth form outer magnetic pole pieces 4*a*. The outer magnetic pole pieces 4*a* are arranged circumferentially at equal intervals of 720/n degrees (45 degrees in the present embodiment). On the other hand, the inner hollow cylinder of the stator 4 forms the inner magnetic pole portion 4*b*. If the outer magnetic pole pieces 4*a* were formed by teeth extending radially, the diameter of the actuator would be increased by the radial length of the magnetic pole pieces 4*a*. However, in the present embodiment, the comb teeth-shaped portions extending in the axial direction form the outer magnetic pole pieces 4*a*, which contributes to minimization of the diameter of the actuator.

Although in the present embodiment, the number of the outer magnetic pole pieces 4*a* (number of the teeth) of the stator 4 is set to half the number n of the sections of the magnetized portion 1*a* of the magnet 1, this is just an ideal number, and hence even if the teeth are reduced in number e.g. by one, it offers no problem to the operation of the actuator though there might be a slight decrease in the output thereof. Even in this case, however, the remaining teeth are required to be arranged circumferentially at intervals of 720/n degrees. The space formed by thinning the number of the teeth may be made use of by another member.

Further, although in the present embodiment, the inner magnetic pole portion 4*b* of the stator 4 is in the form of a simple hollow cylinder, it may be also formed to have a hair comb-like shape similarly to the outer magnetic pole piece 4*a*.

The coil 2 and the bobbin 3 are fixedly fitted between the outer magnetic pole pieces 4*a* and inner magnetic pole portion 4*b* of the stator 4 e.g. by bonding. When the coil 2 is energized, the stator 4 is magnetized.

The outer magnetic pole pieces 4*a* and inner magnetic pole portion 4*b* of the stator 4 are designed to sandwich the magnetized portion 1*a* of the magnet 1 with predetermined clearances such that they are opposed to the respective outer and inner peripheral surfaces of the magnetized portion 1*a*. Accordingly, the magnetic flux generated by the outer magnetic pole pieces 4*a* and the inner magnetic pole member 4*b* which are magnetized by the coil 2 crosses the magnet 1 at a location between the outer magnetic pole pieces 4*a* and the inner magnetic pole portion 4*b* to effectively act on the magnet 1 as the rotor, thereby enhancing the output of the actuator.

As described above, the magnet 1, the coil 2, the bobbin 3 and the stator 4 constitute the actuator of the light amount controller according to the present embodiment.

Reference numeral 5 designates the base board having a central portion thereof formed therein with an opening 5*b*. The magnet 1 is rotatably mounted to the base board 5 by engagement between the engaging portion 1*e* of the magnet 1 and the engaging portion 5*e* of the base board 5, and a magnet stopper 6 is fixed to the base board 5 via the engaging portion 1*e* of the magnet 1 e.g. by bonding, whereby the magnet 1 is prevented from axially falling off. It should be noted that although in the present embodiment, the magnet stopper 6 is used for preventing the magnet 1 from axially falling off, a stopper portion may be formed integrally on the base board 5.

The base board 5 has another engaging portion 5*a* having the outer magnetic pole pieces 4*a* of the stator 4 engaged therewith and fixed thereto e.g. by bonding. In this case, the stator 4 is fixed to the base board such that it is coaxial with the magnet 1, with a predetermined clearance maintained in the axial direction between a top end, as viewed in FIG. 1, of the magnetized portion 1*a* of the magnet 1 and the bobbin 3 fixedly fitted in the stator 4. Although in the present embodiment, the stator 4 is mounted to the base board 5 by engagement between the outer magnetic pole pieces 4*a* and the engaging portion 5*a* of the base board 5 (outer-diameter engagement), the inner magnetic pole member 4*b* may be engaged with the base board 5 (inner-diameter engagement).

Further, the base board 5 is formed integrally with dowels 5*c* and 5*d* projecting in the same direction as the dowels 1*c* and 1*d* of the magnet 1. The base board 5 is further formed with stopper portions 5*f* and 5*g* for limiting rotation of the magnet 1 such that the projection 1*b* of the magnet 1 is brought into abutment with the stopper portions 5*f* and 5*g*. That is, the magnet 1 is allowed to rotate between a position where the projection 1*b* is brought into abutment with the stopper portion 5*f* and a position where the projection 1*b* is brought into abutment with the stopper portion 5*g*.

Reference numerals 7 and 8 designate blades. The blade 7 is formed therein with a round hole 7*a* for the blade 7 to rotatably engage the dowel 5*c* of the base board 5 and an elongate hole 7*b* for the blade 7 to slidably engage the dowel 1*c* of the magnet 1, while the blade 8 is formed therein with a round hole 8*a* for the blade 8 to rotatably engage the dowel 5*d* of the base board 5 and an elongate hole 8*b* for the blade 8 to slidably engage the dowel 1*d* of the magnet 1.

Reference numeral 9 designates a blade retainer having a central portion thereof formed therein with an opening 9a. The blade retainer 9 is secured to the base board 5 with the blades 7 and 8 interposed therebetween through predetermined clearances. The blade retainer 9 serves to bear the blades 7 and 8 in the axial direction.

Rotation of the magnet 1 causes rotation of the blade 7 about the round hole 7a through the elongate hole 7b being pushed by the dowel 1c of the magnet 1, and rotation of the blade 8 about the round hole 8a through the elongate hole 8b being pushed by the dowel 1d of the magnet 1, whereby the amount of light passing through the opening 5b of the base board 5 is controlled.

As described above, the magnet 1, the coil 2, the bobbin 3, the stator 4, the base board 5, the magnet stopper 6, the blades 7 and 8, and the blade retainer 9 constitute the light amount controller of the present embodiment.

FIG. 3A shows the state of the projection 1b of the magnet 1 being in abutment with the stopper portion 5f of the base board 5, while FIG. 3B shows the state of the projection 1b being in abutment with the stopper portion 5g of the base board 5. When the coil 2 is not energized, the magnet 1 is held in a predetermined rotational position in either of the above states. This will be described with reference to FIGS. 3A, 3B, 4 and 5.

Figure 4:
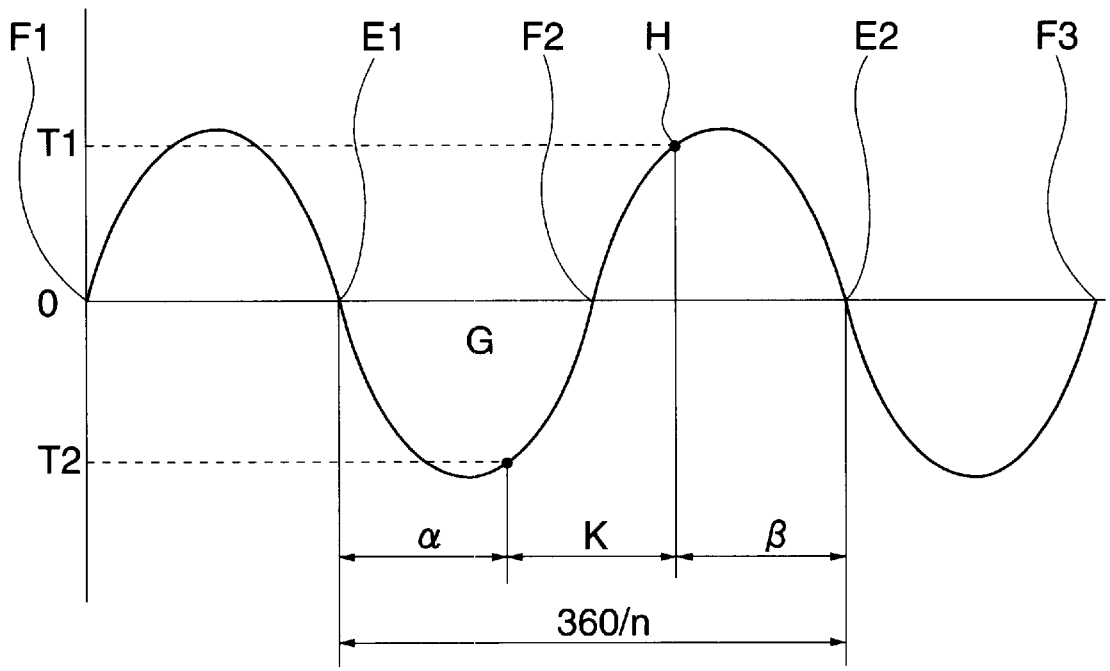
FIG. 4 is a graph showing changes in cogging torque.

FIG. 4 is a graph showing changes in cogging torque (attractive force generated between the magnet 1 and the stator 4 and acting on the magnet 1). The figure shows how the magnet 1 is attracted by the outer magnetic pole pieces 4a according to the rotational position of the magnet 1 when the coil 2 is not energized.

In FIG. 4, the ordinate represents the strength of the magnetic force generated between the magnet 1 and the stator 4 and acting on the magnet 1, while the abscissa represents the rotational phase of the magnet 1. At each of the positions designated by points E1 and E2, when the magnet 1 is about to rotate normally, a reverse rotational force acts on the magnet 1 to return the same to the original position, whereas when the magnet 1 is about to reversely rotate, a normal rotational force acts on the magnet 1 to return the same to the original position. In short, the points E1 and E2 represent the cogged positions at which the magnetic force generated between the magnet 1 and the stator 4 acts on the magnet 1 to stably position the same. On the other hand, points F1, F2 and F3 represent stop positions where the magnet 1 is in an unstable equilibrium state in which even a least phase shift of the magnet 1 causes a force to act on the magnet 1 to rotate the same toward the point E1 or E2. When the coil 2 is not energized, the magnet 1 is always held in stoppage at the point E1 or E2 without staying at the point F1, F2 or F3 due to a vibration or a change in attitude of the light amount controller.

Assuming that the magnet 1 has n magnetized poles (n sections of the magnetized portion 1a), stable cogged points, such as the points E1, E2, exist at intervals of 360/n degrees, and an intermediate position between adjacent ones of the stable cogged points is an unstable point, such as the point F1, F2 or F3.

A numerical simulation by the finite element method has proved that the attractive state between the outer magnetic pole pieces 4a and the magnet 1 during deenergization of the coil changes depending on the relationship between the angle corresponding to a circumferential width of each magnetized pole of the magnet 1 about the rotational axis thereof and the angle corresponding to a circumferential width of each outer magnetic pole piece 4a opposed to the magnet 1 about the rotational axis of the magnet 1. According to the numerical simulation, the cogged position of the magnet 1 changes depending on the angle corresponding to the circumferential width of the outer magnetic pole piece 4a opposed to the magnet 1 about the rotational axis of the magnet 1 (hereinafter referred to as "the opposition angle of the outer magnetic pole piece 4a"). More specifically, on condition that the angle corresponding to the circumferential width of each magnetized pole of the magnet 1 about the rotational angle thereof (hereinafter referred to as "the magnet pole angle") is fixed, when the opposition angle of the outer magnetic pole piece 4a is smaller than a predetermined value, the magnet 1 is stably held at a position where the center of the magnetized pole of the magnet 1 is opposed to the center of the outer magnetic pole piece 4a. On this occasion, the point E1 or E2 described above with reference to FIG. 4 corresponds to the position where the center of the magnetized pole of the magnet 1 is opposed to the center of the outer magnetic pole piece 4a. On the other hand, when the opposition angle of the outer magnetic pole piece 4a is equal to or larger than the predetermined value, the magnet 1 is stably held at a position where the boundary between two poles of the magnet 1 is opposed to the center of the outer magnetic pole piece 4a. On this occasion, the point E1 or E2 corresponds to the position where the boundary between two poles of the magnet 1 is opposed to the center of the outer magnetic pole piece 4a. How the magnet is thus stably held will be explained in more detail with reference to FIG. 5.

Figure 5:
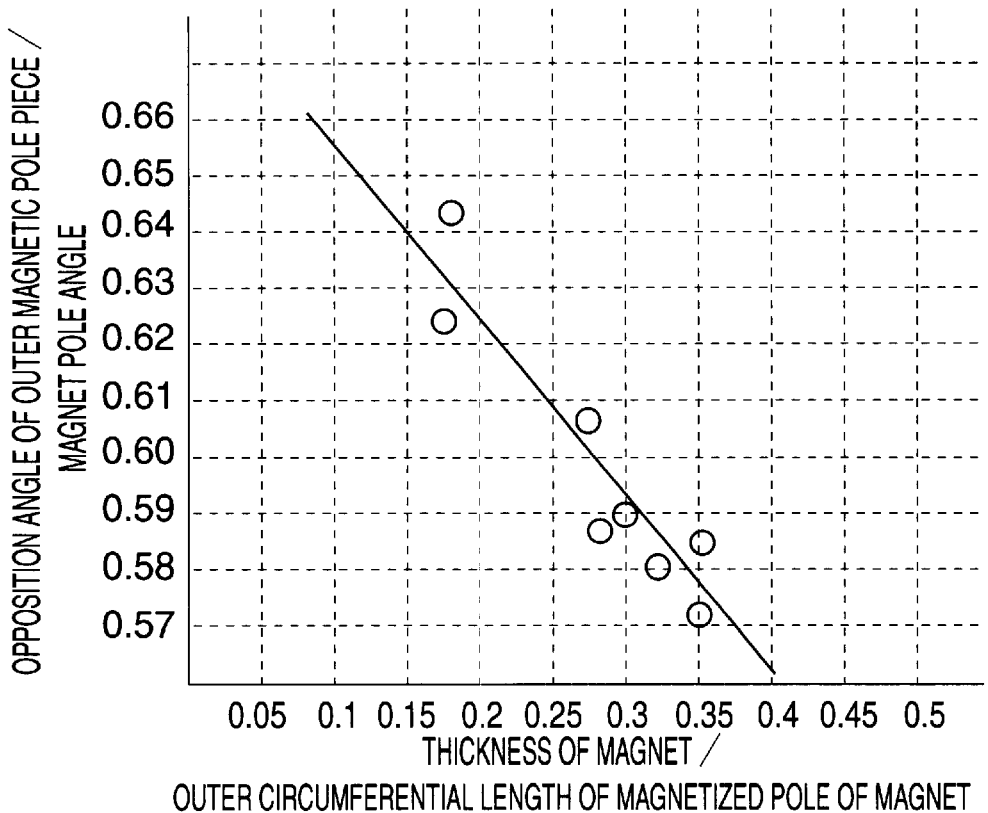
FIG. 5 is a graph showing the relationship between the width dimension of each outer magnetic pole piece appearing in FIG. 1, cogging torque and the dimensions of the magnet.

FIG. 5 is a graph showing how the width dimension of each outer magnetic pole piece 4a, cogging torque, and the dimensions of the magnet 1 are related to each other.

In the figure, the abscissa represents the ratio of the thickness of the magnet 1 to the outer circumferential length of each magnetized pole of the magnet 1, while the ordinate represents the ratio of the opposition angle of the outer magnetic pole piece 4a to the magnet pole angle.

For instance, assuming that the magnet 1 has an outer diameter of 10 mm, an inner diameter of 9 mm, and 16 poles, since the thickness of the magnet 1 is $(10-9)/2$ mm, and the outer circumferential length of each pole is $10 \times \pi/16$ mm, the ratio of the thickness of the magnet 1 to the outer circumferential length of each magnetized pole of the magnet 1 shown on the abscissa is 0.255. Further, assuming that the opposition angle of the outer magnetic pole piece 4a is 13 degrees, since the magnet pole angle is 22.5 degrees, the ratio of the opposition angle of the outer magnetic pole piece 4a to the magnet pole angle shown on the ordinate is 0.578.

Points plotted in FIG. 5 represent values of the ratio of the opposition angle of the outer magnetic pole piece 4a to the magnet pole angle in relation to the ratio of the thickness of the magnet 1 to the circumferential length of each magnetized pole of the magnet 1, which values are assumed by respective models having cogging torque of approximately zero. When the value on the ordinate is designated by Y and the value on the abscissa by X, the points can be approximated by the following equation representative of a straight line: $Y = -0.327X + 0.69$. If $Y < -0.327X + 0.69$ holds, the center of the magnetized pole of the magnet 1 is stably held at a position opposed to the center of the corresponding outer magnetic pole piece 4a, whereas if $Y > -0.327X + 0.69$ holds, the boundary between magnetized poles of the magnet 1 is stably held at a position opposed to the center of the corresponding outer magnetic pole piece 4a.

More specifically, $Y < -0.327X + 0.69$ can be transformed as follows: Assuming that the opposition angle of the outer magnetic pole piece 4a is A degrees, and the magnet 1 has n magnetized poles, an outer diameter of D1 and an inner diameter of D2, Y<−0.327X+0.69 can be transformed into A<(248.4/n)−58.86×(D1−D2)/(D1×π). This means that insomuch as A<(248.4/n)−58.86×(D1−D2)/(D1×π) holds, the center of the magnetized pole of the magnet 1 is stably held at a position opposed to the center of the corresponding outer magnetic pole piece 4a.

In the present embodiment, since it is assumed that the number n of the magnetized poles of the magnet 1 is 16, the outer diameter D1 of the magnet 1 is 10 mm, and the inner diameter D2 of the same 9 mm, (248.4/n)−58.86×(D1−D2)/(D1×π)=13. 65 (degrees) holds. Therefore, if the opposition angle A (degrees) of the outer magnetic pole piece 4a is below 13.65 degrees, the condition of Y<−0.327X+0.69 is satisfied. In the present embodiment, since the opposition angle A (degrees) of the outer magnetic pole piece 4a is set to 13 degrees, the center of each magnetized pole of the magnet 1 can be stably held at a position opposed to the center of the corresponding outer magnetic pole piece 4a.

It is desirable that the opposition angle A (degrees) of the outer magnetic pole piece 4a should be set in consideration of parts dimension tolerances, engagement looseness, and the like. In the above case, for example, if the opposition angle A (degrees) of the outer magnetic pole piece 4a is set to 13.6 degrees, the center of the magnetized pole of the magnet 1 opposed to the corresponding outer magnetic pole piece 4a can theoretically be stably held at a position opposed to the center of the corresponding outer magnetic pole piece 4a. However, if possible parts dimension tolerances, engagement looseness, and the like are taken into account, it can hardly be guaranteed that the center of the magnetized pole of the magnet 1 can always be stably held at the position opposed to the center of the corresponding outer magnetic pole piece 4a. To eliminate this inconvenience, it is necessary to set the opposition angle A (degrees) to a slightly smaller value than required, but if the opposition angle A (degrees) is too much reduced, cogging force is likely to excessively increase, thereby causing reduced torque. Therefore, it is required to set the opposition angle A (degrees) in view of a balance point between the cogging force and required torque.

When the coil is energized to magnetize the outer magnetic pole pieces 4a in a state of the boundary between adjacent ones of the magnetized poles of the magnet 1 being opposed to the center of the corresponding outer magnetic pole piece 4a, a rotational force is always generated in the magnet 1 to start the actuator. On the other hand, when the coil is energized to magnetize the outer magnetic pole pieces 4a in a state of the center of each magnetized pole of the magnet 1 being opposed to the center of the corresponding outer magnetic pole piece 4a, no rotational force is generated in the magnet 1.

In the present embodiment, assuming that the opposition angle of the outer magnetic pole piece 4a is represented by A (degrees), the dimension of the outer diameter of the magnet 1 by D1, and the dimension of the inner diameter of the magnet 1 by D2, these values are set such that the condition of A<(248.4/n)−58.86×(D1−D2)/(D1×π) is satisfied. In this case, the range of the value A corresponds to a region on the lower left side of the straight line plotted in the FIG. 5 graph. When the coil 2 is not energized, the points E1 and E2 described above each correspond to a position where the center of an associated magnetized pole of the magnet 1 is opposed to the center of the corresponding outer magnetic pole piece 4a, and hence the center of the magnetized pole of the magnet 1 is stably held at the position. However, even if the coil 2 is energized in this state to magnetize the outer magnetic pole pieces 4a, no rotational force is generated in the magnet 1.

To overcome this problem, according to the present embodiment, the stopper portion 5f for limiting rotation of the magnet 1 is formed in the base board 5 as shown in FIG. 3A, and the angle formed about the rotational axis 1f of the magnet 1 between the center of a magnetized pole of the magnet 1 and the center of the corresponding outer magnetic pole piece 4a when the projection 1b of the magnet 1 is in abutment with the stopper portion 5f, is set to aα degrees. As a result, when the coil 2 is energized in the FIG. 3A state to magnetize the outer magnetic pole pieces 4a, a rotational force is generated in the magnet 1, whereby the actuator is stably started. The position of the magnet 1 in the FIG. 3A state corresponds to a point G in FIG. 4. Cogging torque acting on the magnet 1 at this position is T2. The cogging torque acts as a reverse rotational force (force acting in a counterclockwise direction as viewed in FIG. 3A) to reversely rotate the magnet 1 back toward the point E1. In other words, a force for holding the magnet 1 at the position where the projection 1b of the magnet 1 is in abutment with the stopper portion 5f is obtained by the cogging torque T2. Thus, the magnet 1 is stably held at the position (FIG. 3A position) when the coil 2 is not energized.

Similarly, according to the present embodiment, the stopper portion 5g for limiting rotation of the magnet 1 is formed in the base board 5 as shown in FIG. 3B, and the angle formed about the rotational axis 1f of the magnet 1 between the center of a magnetized pole of the magnet 1 and the center of the corresponding outer magnetic pole piece 4a when the projection 1b of the magnet 1 is in abutment with the stopper portion 5g, is set to β degrees. As a result, when the coil 2 is energized in the FIG. 3B state to magnetize the outer magnetic pole pieces 4a, a rotational force is generated in the magnet 1, whereby the actuator is stably started.

The position of the magnet 1 in the FIG. 3B state corresponds to a point H in FIG. 4. Cogging torque acting on the magnet 1 at this position is T1. The cogging torque acts as a normal rotational force (force acting in a clockwise direction as viewed in FIG. 3B) to normally rotate the magnet toward the point E2. In other words, a force for holding the magnet 1 at the position where the projection 1b of the magnet 1 is in abutment with the stopper portion 5g is obtained by the cogging torque T1. Thus, the magnet 1 is stably held at the position (FIG. 3B position) when the coil 2 is not energized.

Next, rotating operations of the magnet 1 of the driving device will be described with reference to FIGS. 3A and 3B.

As described above, when the coil 2 is not energized, the magnet 1 is stably held at the position shown in FIG. 3A. When the coil 2 is energized in the FIG. 3A state to magnetize the outer magnetic pole pieces 4a and inner magnetic pole portion 4b of the stator 4 as S poles and N pole, respectively, the magnetization of the outer magnetic pole pieces 4a and the inner magnetic pole portion 4b causes a magnetic force to act on the magnet 1 in a direction of normal rotation, whereby the magnet 1 as the rotor starts clockwise rotation smoothly. Then, the coil 2 is deenergized in timing of the magnet 1 being brought into the FIG. 3B state where the magnet 1 has rotated through an angle of K degrees about its rotational axis 1f. The state shown in FIG. 3B corresponds to the point H in FIG. 4, and hence the magnet 1 is stably held at the position by the cogging force T1 as described above.

Then, when the coil 2 is reversely energized to magnetize the outer magnetic pole pieces 4a and inner magnetic pole portion 4b of the stator 4 as N poles and S pole, respectively, the magnetization of the outer magnetic pole pieces 4a and the inner magnetic pole portion 4b causes a magnetic force to act on the magnet 1 in a direction of reverse rotation, whereby the magnet 1 as the rotor starts counterclockwise rotation smoothly. Then, the coil 2 is deenergized in timing of the magnet 1 being brought into the FIG. 3A state where the magnet 1 has rotated through an angle of K degrees about its rotational axis 1f. The state shown in FIG. 3A corresponds to the point G in FIG. 4, and hence the magnet 1 is stably held at the position by the cogging force T2 as described above.

As described above, by switching the direction of energizing the coil 2, the state of the magnet 1 as the rotor is switched between one shown in FIG. 3A and one shown in FIG. 3B. The magnet 1 is allowed to rotate so long as the rotational range K of the magnet 1 is set within a range which does not reach either of the points E1 and E2, but still in setting the rotational range K of the magnet 1, it is necessary to consider the balance point between the cogging force and the required torque as well as the required amount of rotation. The points E1 and E2 are positions corresponding to the respective centers of an S pole and an N pole adjacent to each other of the magnet 1.

As described hereinbefore, the blades 7 and 8 rotate in a manner interlocked with the rotation of the magnet 1. When the magnet 1 is in the FIG. 3A state, the blades 7 and 8 are each held in a position away from the opening 5b of the base board 5. On the other hand, when the magnet 1 is in the FIG. 3B state, the opening 5b of the base board 5 is closed by the blades 7 and 8. Accordingly, by switching the direction of energization of the coil 2, it is possible to shift the position of the blades 7 and 8 between a closing position and an opening position, thereby controlling the amount of light passing through the opening 5b of the base board 5. Further, when the coil 2 is not energized, the blades 7 and 8 are held at respective positions by the attractive force between the magnet 1 and the outer magnetic pole pieces 4a. Therefore, even during the deenergization period, the blades 7 and 8 are prevented from being moved due to a shock or the like, which makes it possible to enhance reliability of the light amount controller and reduce power consumption.

Thus, the light amount controller can function as a shutter device which is capable of stably maintaining both an open state and a closed state without energization of the coil.

Next, a light amount controller according to a second embodiment of the present invention will be described in detail with reference to FIGS. 6 to 8B.

Figure 6:
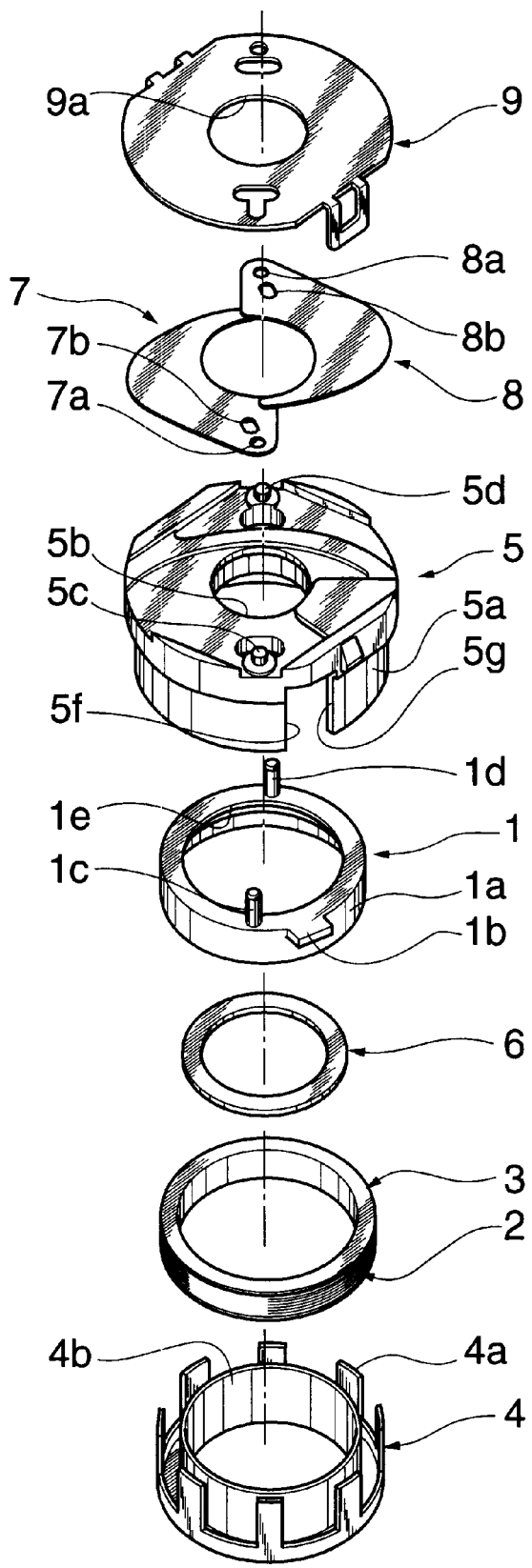
FIG. 6 is an exploded perspective view of a light amount controller equipped with a driving device according to a second embodiment of the present invention.
Figure 7:
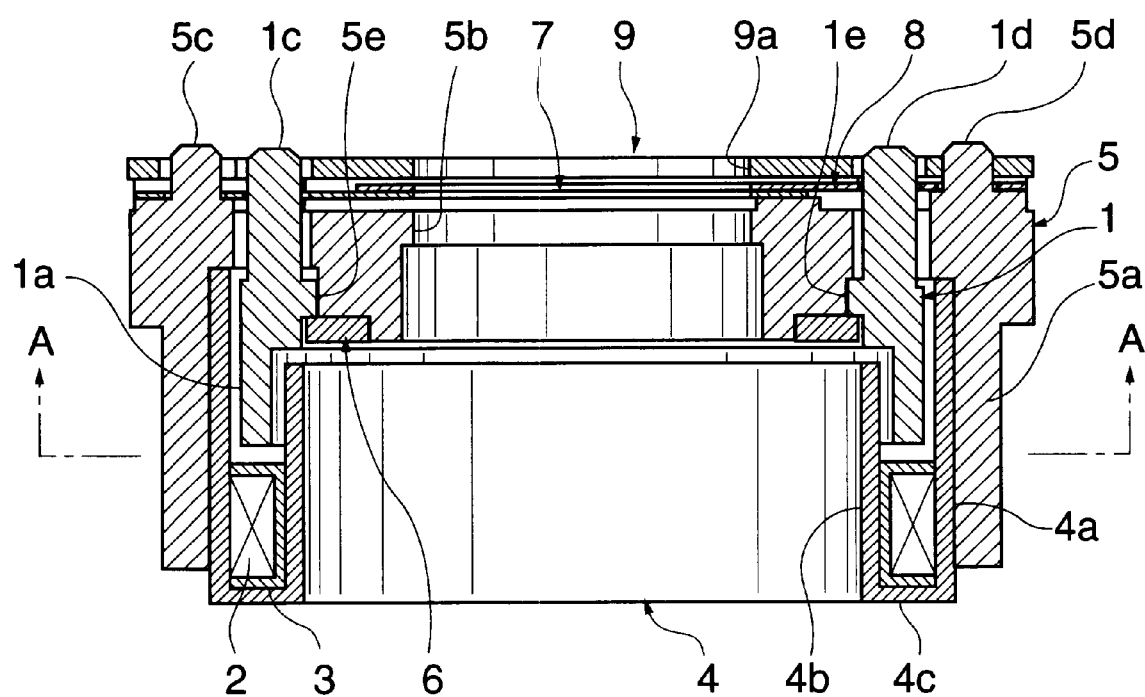
FIG. 7 is an axial cross-sectional view showing an assembled state of the light amount controller of FIG. 6.
Figure 8A:
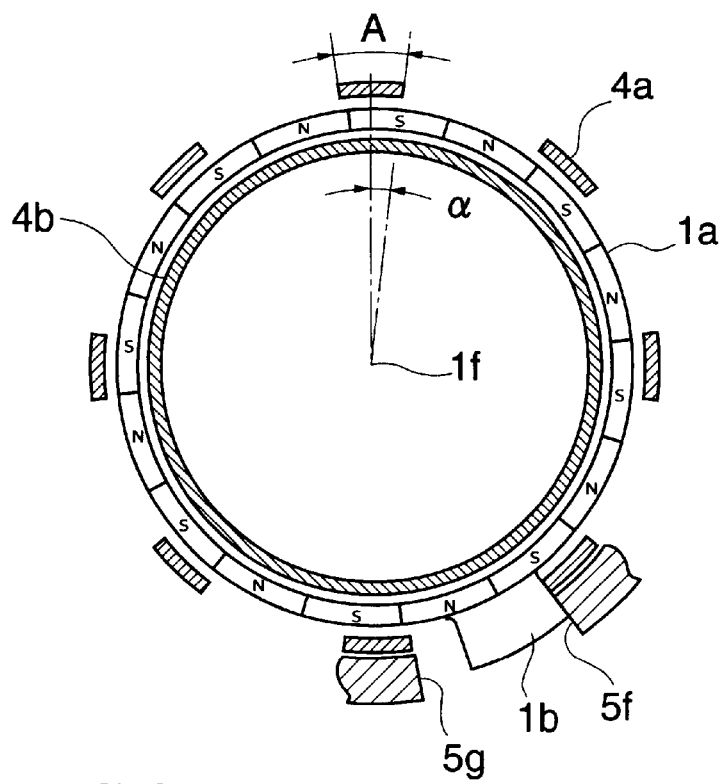
FIG. 8A is a transverse cross-sectional view showing a state in which a projection 1b of a magnet 1 appearing in FIG. 6 is in abutment with a stopper portion 5f of a base board 5.
Figure 8B:
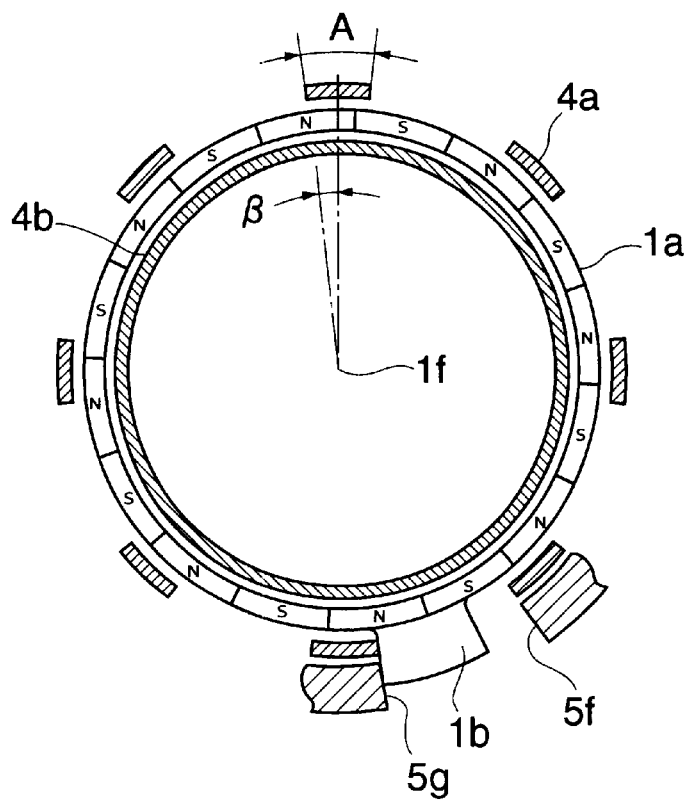
FIG. 8B is a transverse cross-sectional view showing a state in which the projection 1b of the magnet 1 appearing in FIG. 6 is in abutment with a stopper portion 5g of the base board 5.

FIGS. 6 to 8B show the light amount controller according to the second embodiment. FIG. 6 is an exploded perspective view of the light amount controller equipped with a driving device according to the second embodiment. FIG. 7 is an axial cross-sectional view of an assembled state of the light amount controller equipped with the driving device shown in FIG. 6, while FIGS. 8A, 8B are views useful in explaining rotating operations of a magnet of the driving device. In these figures, component elements and parts corresponding to those in the first embodiment are designated by identical reference numerals.

The light amount controller of the second embodiment is identical in construction to the light amount controller of the first embodiment, except for the construction of a stator 4 thereof, described hereafter.

The stator 4 is configured such that the inner magnetic pole portion 4b of the stator 4 has an axial length set such that the top end of the portion 4b is located below the top end of the inner peripheral surface of the magnetized portion 1a of the magnet 1, because the engaging portion 1e and the magnet retainer 6a are provided inside the magnet 1. Consequently, the inner magnetic pole portion 4b generates a force which axially pulls the magnet 1 (downward as viewed in FIG. 7). In view of the generation of the force axially pulling the magnet 1, it is preferred that each outer magnetic pole piece 4a (each tooth of the hair comb shape) has such an axial length substantially larger than that of the outer peripheral surface of the magnetized portion 1a of the magnet 1 (see FIG. 7). This construction causes the outer magnetic pole pieces 4a to develop an attractive force axially pulling the magnet 1 upward as viewed in FIG. 7, which reduces the force of the inner magnetic pole portion 4b axially acting on the magnet 1 (i.e. attractive force acting downward as viewed in FIG. 7). As a result, sliding friction between the magnet 1 and the magnet stopper 6 axially holding the magnet 1 is reduced, which ensures smooth rotation of the magnet 1.

To avoid interference with the outer magnetic pole pieces 4a, the projection 1b in the present embodiment is arranged in an offset position from the position of the projection 1b in the present embodiment, and correspondingly to this, the stoppers 5f and 5g in the present embodiment are also arranged in offset positions from the respective positions of the stoppers 5f and 5g in the present embodiment. The rotating operations of the magnet 1 are the same as described in the present embodiment.

Although in each of the above first and second embodiments, the light amount controller has two blades which can be opened and closed, the controller may be provided with a single blade or triple or more blades.

Further, although the light amount controller is applied to a shutter device capable of switching the state of the blades between the opened state and the closed state, the light amount controller may be applied to a variable diaphragm device e.g. for switching the state of the blades between an opened state and a reduced aperture state. Further, the light amount controller may be applied to a filter changeover device.

Next, a shutter according to a third embodiment of the present invention will be described in detail with reference to FIGS. 9 to 15.

Figure 9:
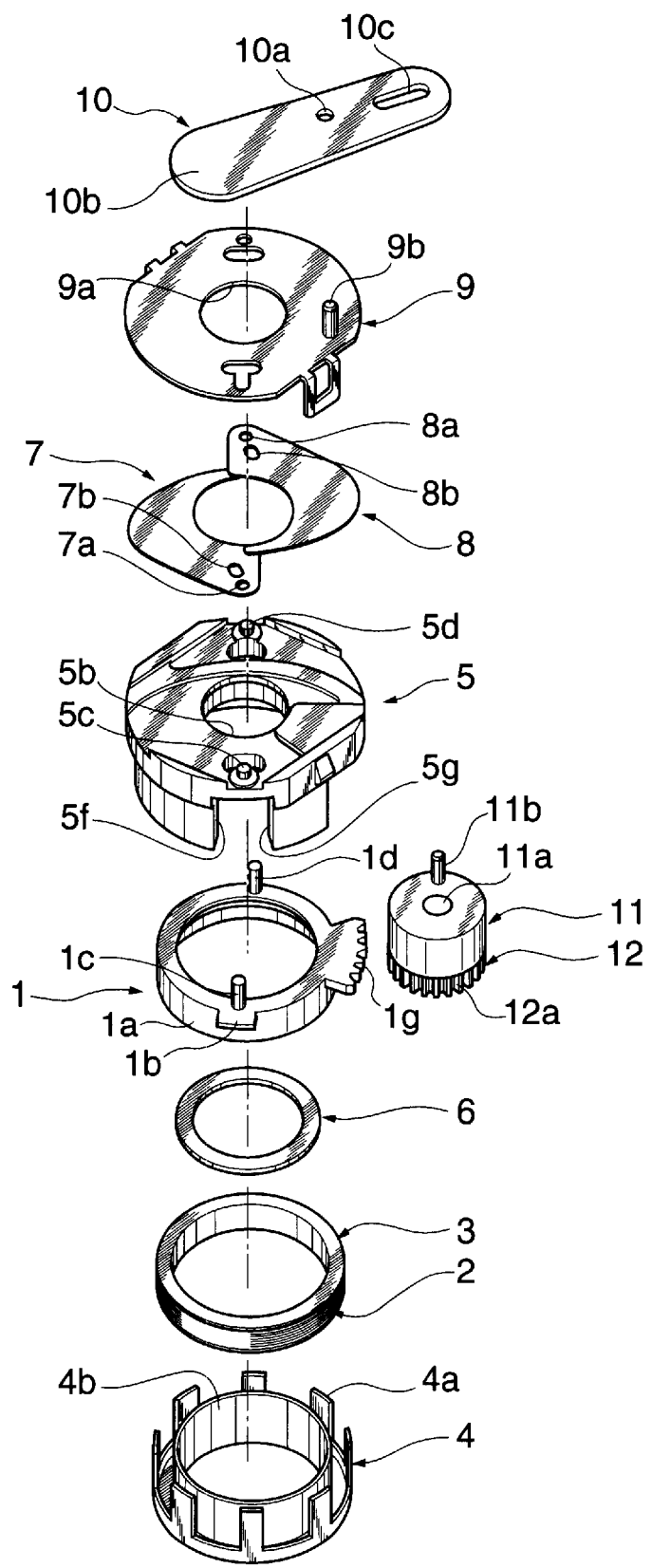
FIG. 9 is an exploded perspective view of a shutter according to a third embodiment of the present invention.
Figure 10:
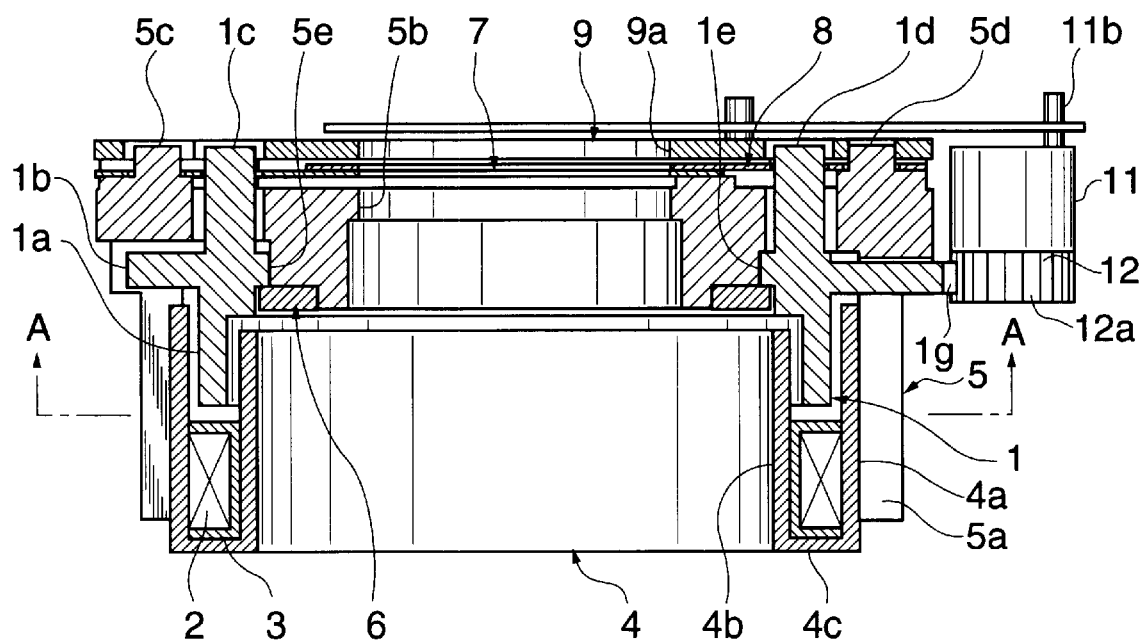
FIG. 10 is an axial cross-sectional view showing an assembled state of the shutter of FIG. 9.
Figure 11:
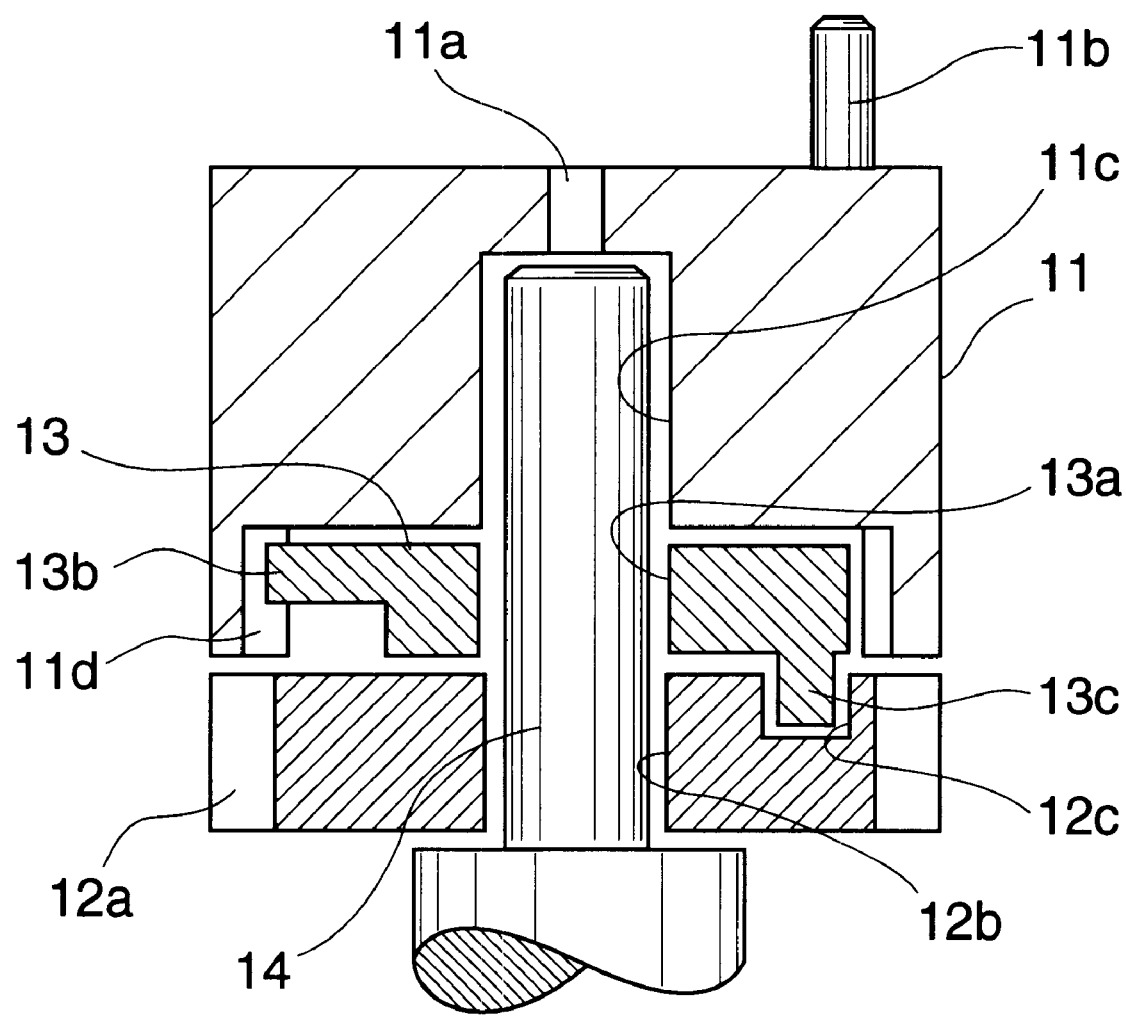
FIG. 11 is a cross-sectional view of a one-way clutch.
Figure 12:
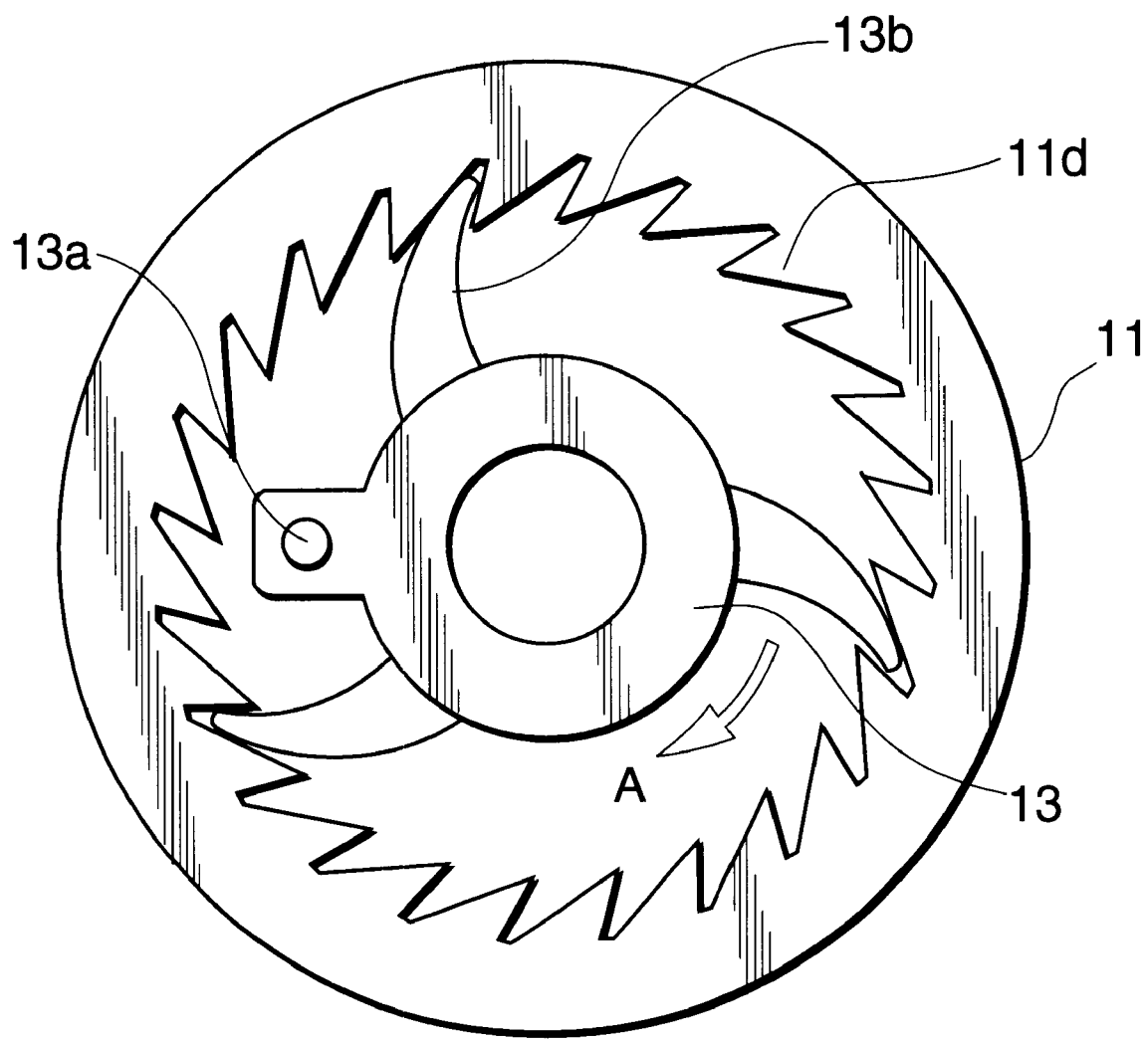
FIG. 12 is a plan view of the one-way clutch.
Figure 13:
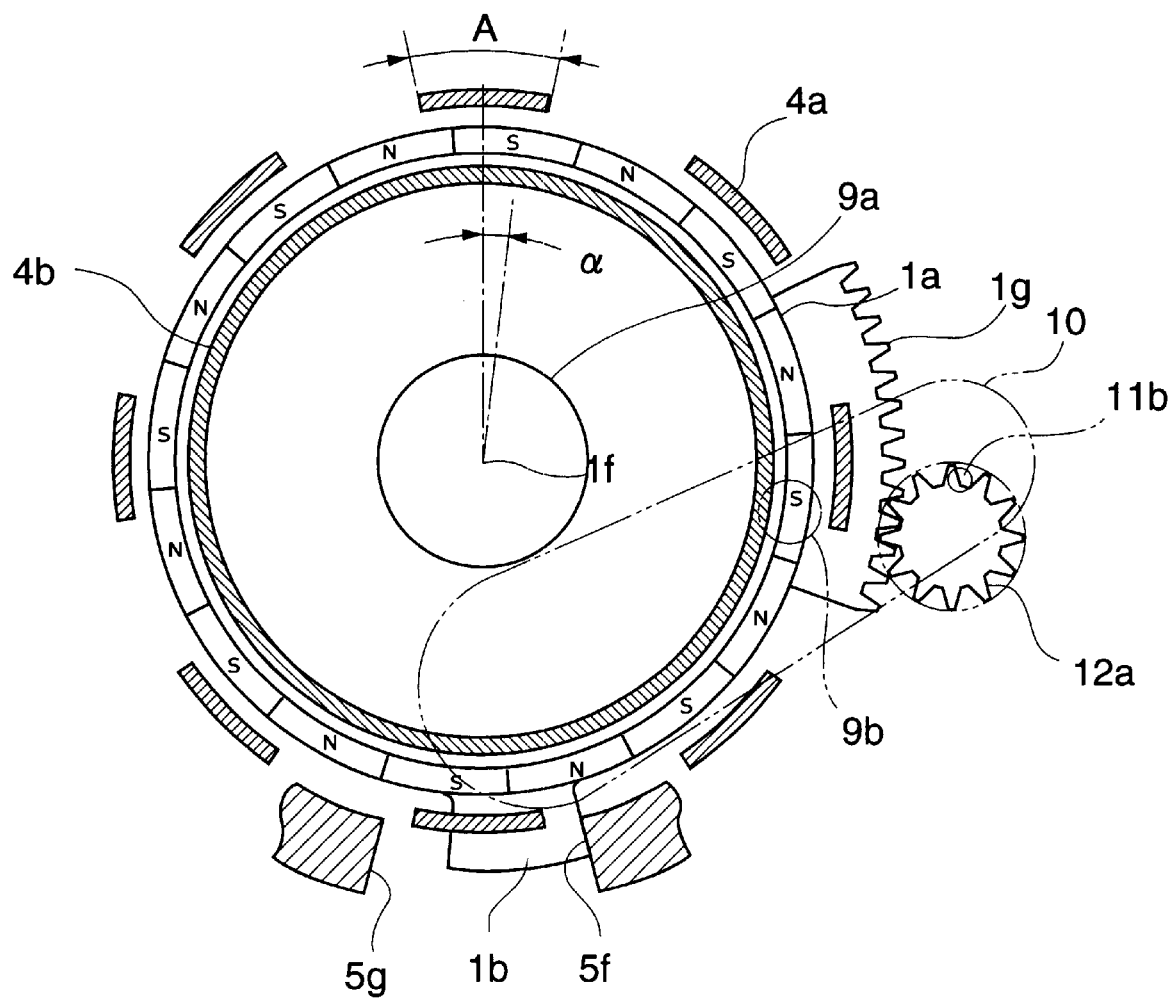
FIG. 13 is a view useful in explaining how a magnet of the FIG. 9 shutter is rotated.
Figure 14:
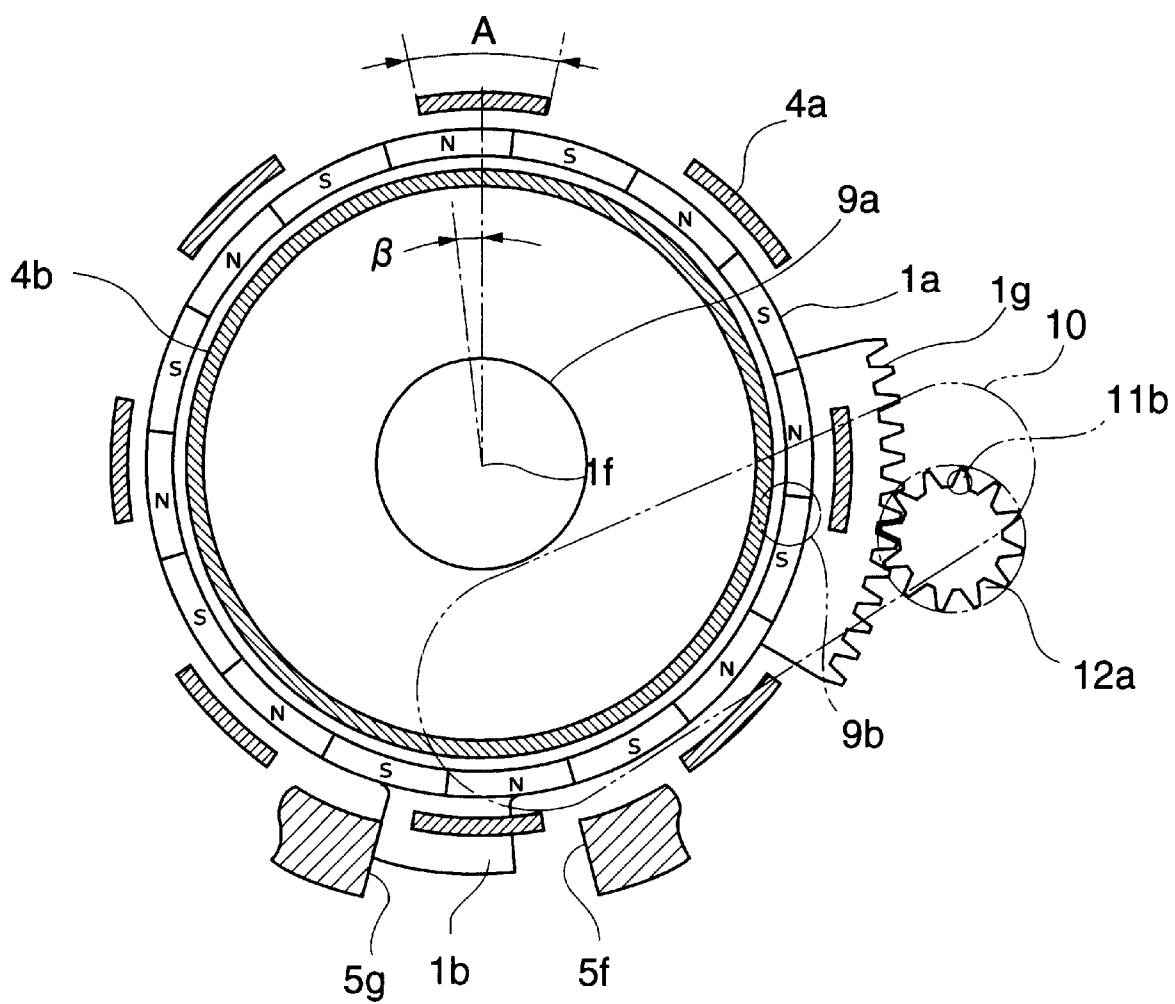
FIG. 14 is a view useful in explaining how the magnet of the FIG. 9 shutter is rotated.
Figure 15:
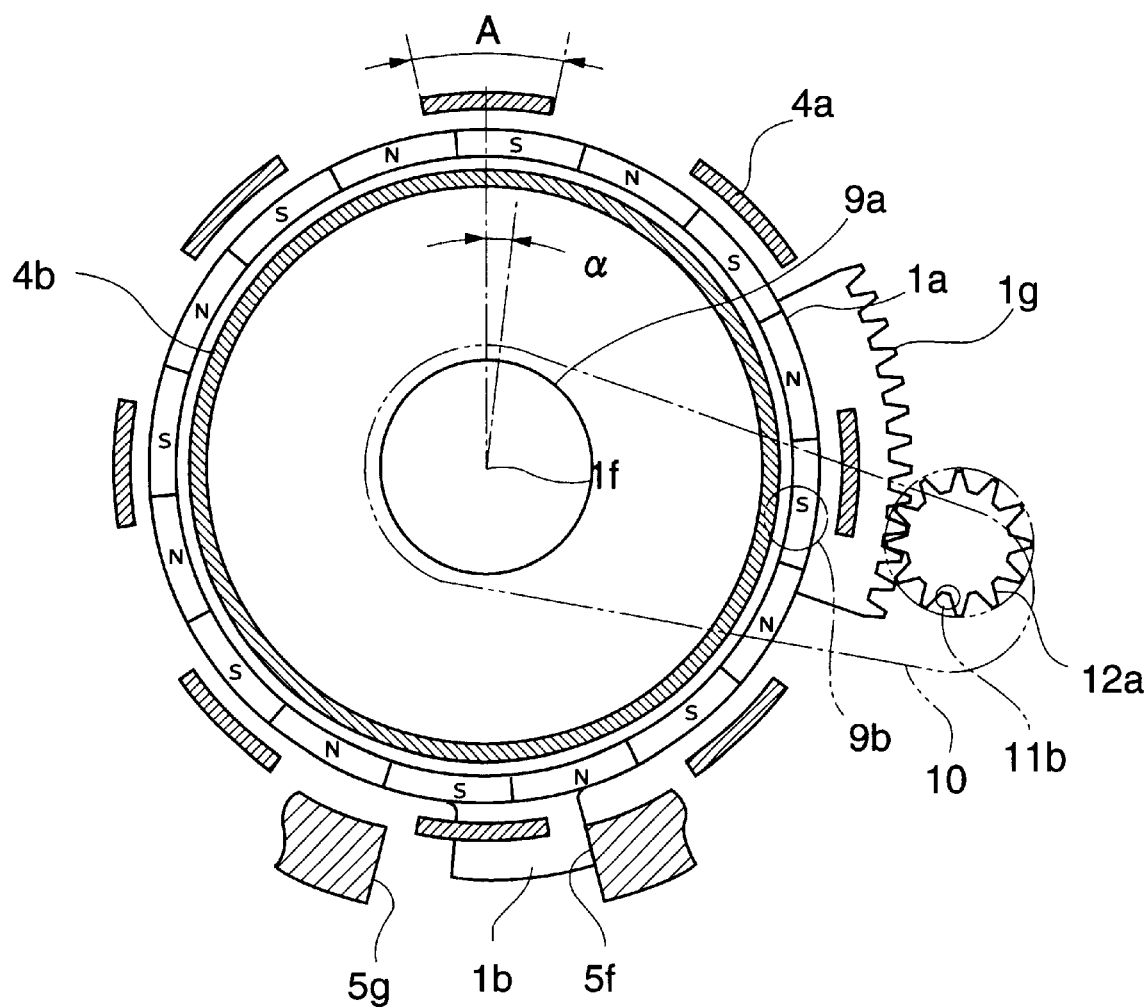
FIG. 15 is a view useful in explaining how the magnet of the FIG. 9 shutter is rotated.

FIGS. 9 to 15 show the shutter according to the third embodiment. FIG. 9 is an exploded perspective view of the shutter. FIG. 10 is an axial cross-sectional view of an assembled state of the FIG. 9 shutter, and FIGS. 13 to 15 are views useful in explaining rotating operations of a magnet of the FIG. 9 shutter.

In the shutter of the third embodiment, component elements and parts designated by numerals from 1 to 6 are identical in construction to those of the light amount controller of the first embodiment, and therefore are designated by identical reference numerals, and a description will be given of only different component elements of the shutter which distinguish the shutter from the light amount controller of the first embodiment.

In the following description, it is assumed that a rotational angle through which the magnet 1 can rotate between a position where the projection 1b is in abutment with the stopper portion 5f and a position where the projection 1b is in abutment with the stopper portion 5g is set to K degrees.

In FIGS. 9 and 10, reference numerals 7 and 8 designate shutter blades. A round hole 7a of the shutter blade 7 is rotatably engaged with the dowel 5c of the base board 5, and an elongate hole 7b of the same is slidably engaged with the dowel 1c of the magnet 1, while a round hole 8a of the shutter blade 8 is rotatably engaged with the dowel 5d of the base board 5, and an elongate hole 8b of the same is slidably engaged with the dowel 1d of the magnet 1.

Reference numeral 9 designates a shutter blade retainer having a central portion thereof formed therein with a maximum opening 9a for controlling the maximum opening amount. The shutter blade retainer 9 is secured to the base board 5 with the shutter blades 7 and 8 interposed therebetween through predetermined clearances. The shutter blade retainer 9 axially bears the shutter blades 7 and 8.

Rotation of the magnet 1 causes rotation of the blade 7 about the round hole 7a through the elongate hole 7b being pushed by the dowel 1c of the magnet 1, and rotation of the blade 8 about the round hole 8a through the elongate hole 8b being pushed by the dowel 1d of the magnet 1, whereby the shutter blades 7 and 8 are operated between a light blocking position for blocking the maximum opening 9a of the shutter blade retainer 9 and the opening 5a of the base board 5 and an exposure position for allowing passage of light.

Reference numeral 10 designates an ND filter plate which is formed therein with a hole 10a for rotatably engaging with a dowel 9b of the shutter blade retainer 9. Reference numeral 10b designates an ND filter portion having a small light transmittance. The ND filter portion 10b can move between a position covering the opening 9a of the shutter blade retainer 9 and a position away from the opening 9a, to thereby adjust the amount of light passing through the opening 9a.

Members designated by numeral references 11, 12, 13 form a one-way clutch. FIG. 11 shows the one-way clutch in cross section. The reference numeral 11 designates a cylindrical output member having a hole 11a concentrically formed therein and capable of rotation about a rotational axis extending through the hole 11a. The output member 11 corresponds to an output side of a one-way clutch recited in claims appended hereto. A pin 11b is slidably engaged with an elongate hole 10c of the ND filter plate 10. The output member 11 is rotated to shift the rotational position of the ND filter plate 10 between the position covering the opening 9a of the shutter blade retainer 9 and the position away from the opening 9a. As shown in FIG. 11, the output member 11 is rotatably mounted on a pin 14 extending from a base plate, not shown, via a central recess 11c formed therein.

The output member 11 has an opening in a lower end face thereof, which has its wall formed with a ratchet gear 11d.

Reference numeral 12 designates a cylindrical input member corresponding to an input side of the one-way clutch recited in claims appended hereto. The input member 12 has an outer peripheral surface thereof formed with a gear portion 12a meshing with a gear portion 1g of the magnet 1 and an inner peripheral surface thereof formed with a portion 12b rotatably engaging with the pin 14 extending from the base plate, not shown. The number of gear teeth of the gear portion 12a is set such that rotation of the magnet 1 through θ degrees causes the input member 12 to rotate through a half turn or 180 degrees. FIG. 12 is a plan view showing the relationship between the output member 11 and a ratchet member 13, referred to hereinbelow, as viewed from the input member 12 side.

The ratchet member 13, as shown in FIG. 12, has elastic pawls 13b engaging with the ratchet gear 11d of the output member 11. The ratchet member 13 has a central hole 13a formed therein and rotatably engaging with the pin 14. Rotation of the ratchet member 13 in a direction indicated by an arrow A in FIG. 12 causes a driving force to be transmitted from the ratchet member 13 to the output member 11. On the other hand, rotation of the ratchet member 13 in the opposite direction to the direction indicated by the arrow A causes the pawls 13b to be warped and slide over the ratchet gear 11d, thereby preventing rotation of the output member 11. The ratchet member 13 is formed with a pin 13c as shown in FIG. 12. The pin 13c is engaged with a hole 12c formed in the input member 12, so that the ratchet member 13 always rotates in unison with the input member 12.

As described above, the shutter according to the third embodiment is comprised of the magnet 1, the coil 2, the bobbin 3, the stator 4, the base board 5, the magnet stopper 6, the shutter blades 7 and 8, the shutter blade retainer 9, the ND filter plate 10, and the one-way clutch formed by the members 11, 12, 13. FIG. 10 shows an assembled state of the FIG. 9 shutter, and FIGS. 13 to 15 are cross-sectional views taken on line A—A of FIG. 10. FIGS. 13 and 15 show the state of the projection 1b of the magnet 1 being in abutment with the stopper portion 5f of the base board 5, while FIG. 14 shows the state of the projection 1b being in abutment with the stopper portion 5g of the base board 5. The rotational position of the magnet 1 in FIGS. 13 and 15 is shifted from the rotational position in FIG. 4 by θ degrees.

When the coil 2 is not energized, the magnet 1 is held in any of the above states, just as in the first embodiment.

In the third embodiment, similarly to the first embodiment, the stopper portion 5f for limiting rotation of the magnet 1 is formed in the base board 5 as shown in FIG. 13, and the angle formed about the rotational axis 1f of the magnet 1 between the center of a magnetized pole of the magnet 1 and the center of the corresponding outer magnetic pole piece 4a when the projection 1b of the magnet 1 is in abutment with the stopper portion 5f, is set to α degrees. As a result, when the coil 2 is energized in the FIG. 13 state to magnetize the outer magnetic pole piece 4a, a rotational force is generated in the magnet 1, whereby the shutter is stably started.

The position of the magnet 1 in the FIG. 13 state corresponds to the point G in FIG. 4. Cogging torque acting on the magnet 1 at this position is T2. The cogging torque acts as a reverse rotational force (a force acting in a counter-clockwise direction as viewed in FIGS. 13 to 15) to reversely rotate the magnet 1 back toward the point E1. In other words, a force for holding the magnet 1 at the position where the projection 1b of the magnet 1 is in abutment with the stopper portion 5f is obtained by the cogging torque T2. Thus, the magnet 1 is stably held at the position (FIG. 13 position) when the coil 2 is not energized.

Similarly, according to the present embodiment, the stopper portion 5g for limiting rotation of the magnet 1 is formed on the base board 5 as shown in FIG. 14, and the angle formed about the rotational axis 1f of the magnet 1 between the center of the magnetized pole of the magnet 1 and the center of the corresponding outer magnetic pole piece 4a when the projection 1b of the magnet 1 is in abutment with the stopper portion 5g, is set to β degrees. As a result, when the coil 2 is energized in the FIG. 14 state to magnetize the outer magnetic pole pieces 4a, the rotational force is generated in the magnet 1, whereby the shutter is stably started.

The position of the magnet 1 in the FIG. 14 state corresponds to the point H in FIG. 4. Cogging torque acting on the magnet 1 at this position is T1. The cogging torque acts as a normal rotational force (a force acting in a clockwise direction as viewed in FIGS. 13 to 15) to rotate the magnet 1 toward the point E2. In other words, a force for holding the magnet 1 at the position where the projection 1b of the magnet 1 is in abutment with the stopper portion 5g is obtained by the cogging torque T1. Thus, the magnet 1 is stably held at the position (FIG. 14 position) when the coil 2 is not energized. FIG. 14 shows the state of the magnet 1 having been rotated through K degrees from the FIG. 13 state.

Next, rotating operations of the magnet 1 of the shutter will be described with reference to FIGS. 13 to 15.

As described above, when the coil 2 is not energized, the magnet 1 is stably held at the position shown in FIG. 13. When the magnet 1 is at this position, the pin 11b of the output member 11 does not move, and hence the ND filter portion 10b of the ND filter plate 10 stays at the position away from the opening 9a of the shutter blade retainer 9. This state will be referred to as a first exposure state.

When the coil 2 is energized in the FIG. 13 state to magnetize the outer magnetic pole pieces 4a and inner magnetic pole portion 4b of the stator 4 as S poles and N pole, respectively, the magnetization of the outer magnetic pole pieces 4a and the inner magnetic pole portion 4b causes a magnetic force to act on the magnet 1 in a direction of normal rotation, whereby the magnet 1 as the rotor starts clockwise rotation smoothly. Then, the coil 2 is deenergized in timing of the magnet 1 being brought into the FIG. 14 state where the magnet 1 has rotated about its rotational axis 1f through an angle of K degrees. The state shown in FIG. 14 corresponds to the point H, and hence the magnet 1 is stably held at the position by the cogging force T1 as described above.

The clockwise rotation of the magnet 1 causes counterclockwise rotation of the input member. However, as described above with reference to FIGS. 11 and 12, the pawls 13b of the ratchet member 13 which rotates in unison with the input member 12 are warped to slide over the ratchet gear 11d, thereby preventing rotation of the output member 11. Accordingly, the pin 11b of the output member 11 does not move, and hence the ND filter portion 10b of the ND filter plate 10 stays at the position away from the opening 9a of the shutter blade retainer 9.

When the coil 2 is reversely energized in this state to magnetize the outer magnetic pole pieces 4a and inner magnetic pole portion 4b of the stator 4 as N poles and S pole, respectively, the magnetization of the outer magnetic pole pieces 4a and the inner magnetic pole portion 4b causes a magnetic force to act on the magnet 1 in a direction of reverse rotation, whereby the magnet 1 starts counterclockwise rotation smoothly. Then, the coil 2 is deenergized in timing of the magnet 1 being brought into the FIG. 15 state where the magnet 1 has rotated about its rotational axis 1f through K degrees. Similarly to the state shown in FIG. 13, the state shown in FIG. 15 corresponds to the point G in FIG. 4, and hence the magnet 1 is stably held at the position by the cogging force T2 as described above. The FIG. 13 state and the FIG. 15 state are identical to each other in the rotational position of the magnet 1, but different in the position of the pin 11b of the output member 11.

The counterclockwise rotation of the magnet 1 through K degrees from the FIG. 14 state causes the input member 12 to rotate through a half turn or 180 degrees. The pawls 13b of the ratchet member 13 which rotates in unison with the input member 12 are brought into engagement with the ratchet gear 11d of the output member 11 to rotate the output member 11 through a half turn or 180 degrees. In accordance with this rotation, the pin 11b of the output member 11 turns the ND filter portion 10b of the ND filter plate 10 to the position covering the opening 9a of the shutter blade retainer 9. In this state, the amount of light passing through the opening 9a has become smaller than in the state shown in FIG. 13.

This state will be referred to as a second exposure state. When the coil 2 is energized again in the second exposure state to magnetize the outer magnetic pole pieces 4a and inner magnetic pole portion 4b of the stator 4 as S poles and N pole, respectively, so as to cause clockwise rotation of the magnet 1 through K degrees, and then the outer magnetic pole pieces 4a and inner magnetic pole portion 4b are magnetized as N poles and S pole, respectively, by reverse energization of the coil 2 to cause counterclockwise rotation of the magnet 1, the shutter returns to the first exposure state shown in FIG. 13. This means that by causing counterclockwise rotation of the magnet 1, it is possible to switch the state of the shutter between the first exposure state where the ND filter portion 10b is withdrawn from the opening 9a of the shutter blade retainer 9 and the second exposure state where the ND filter portion 10b covers the opening 9a.

As described above, the shutter blades 7 and 8 rotate in a manner interlocked with the rotation of the magnet 1. When the magnet 1 is in the FIG. 13 state, the shutter blades 7 and 8 are held at the respective positions away from the opening 5b of the base board 5. On the other hand, when the magnet 1 is in the FIG. 14 state, the maximum opening 9a of the shutter blade retainer 9 and the opening 5b of the base board 5 are closed by the shutter blades 7 and 8.

Thus, by switching the direction of energization of the coil 2, it is possible to shift the shutter blades 7 and 8 between a closing position and an opening position, thereby controlling the amount of light passing through the opening 9a of the shutter blade retainer 9 and the opening 5b of the base board 5. This means that the shutter device can be considered to have a photographing lens having two kinds of F values, so that when the object field is dark, it is possible to carry out exposure in the first exposure state, while when the object field is bright, it is possible to carry out exposure in the second exposure state.

Further, the shutter blades 7 and 8 can be driven by the single actuator and it is not necessary to continue energization to hold the shutter blades open to the maximum aperture. Furthermore, since the amount of light passing through is adjusted by shifting the position of the ND filter, it is possible to prevent occurrence of a light diffraction phenomenon.

Next, a shutter according to a fourth embodiment of the present invention will be described in detail with reference to FIG. 16.

Figure 16:
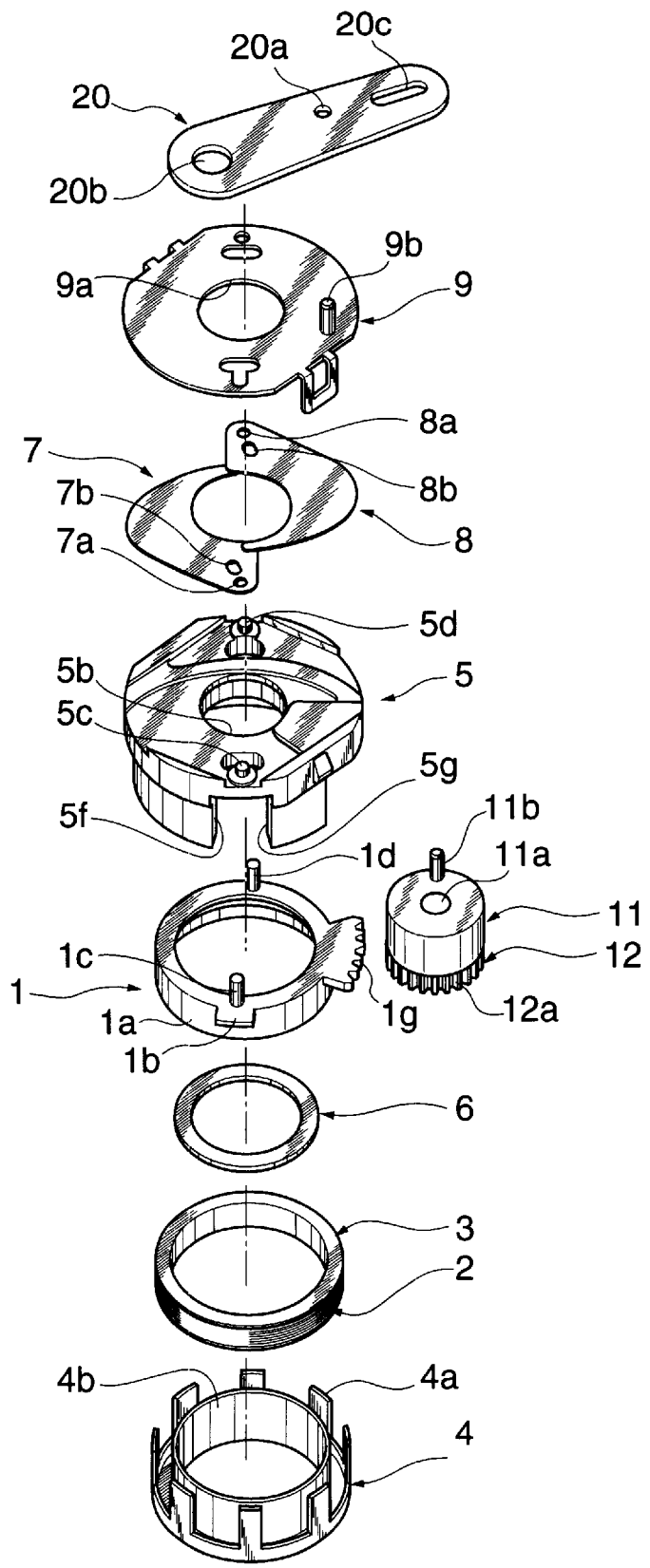
FIG. 16 is an exploded perspective view of a shutter according to a fourth embodiment of the present invention.
Figure 17:
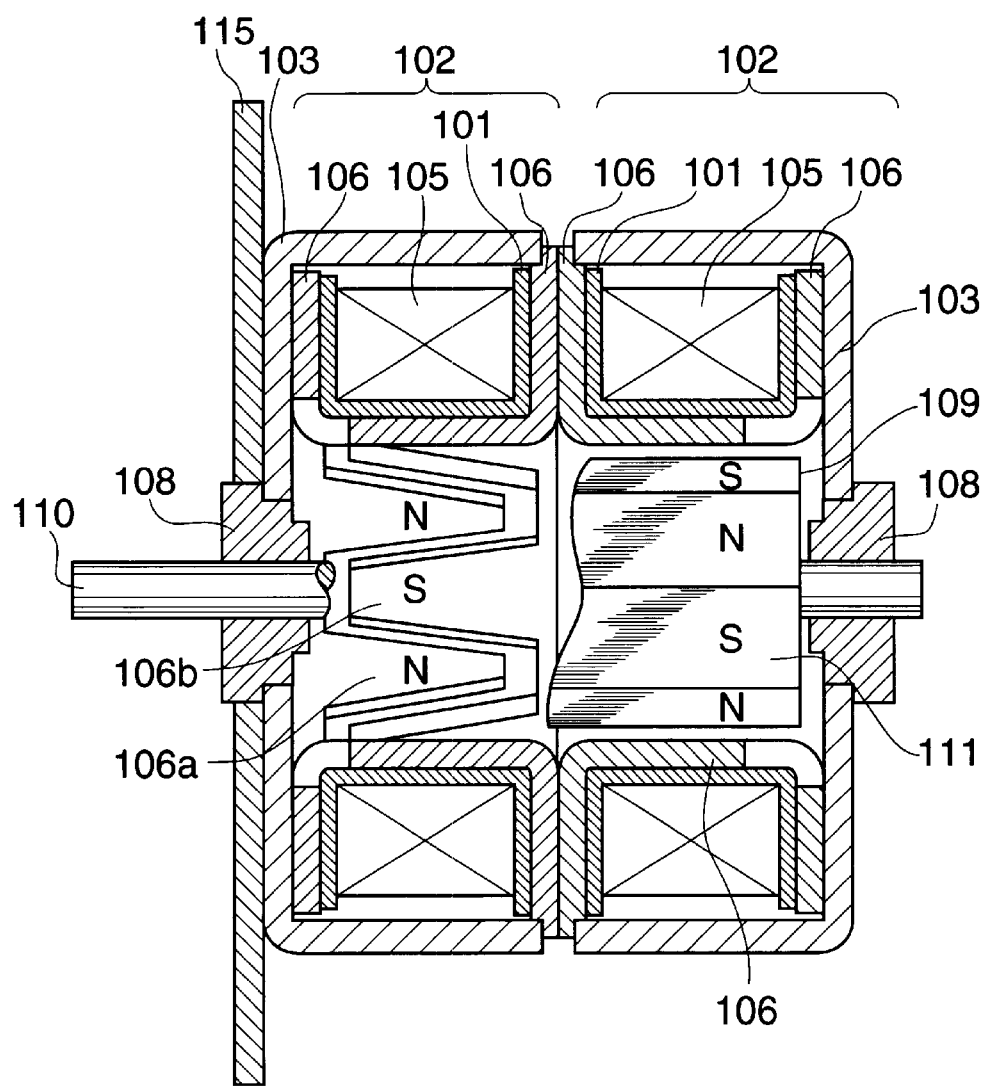
FIG. 17 is a cross-sectional view of a conventional stepper motor.
Figure 18:
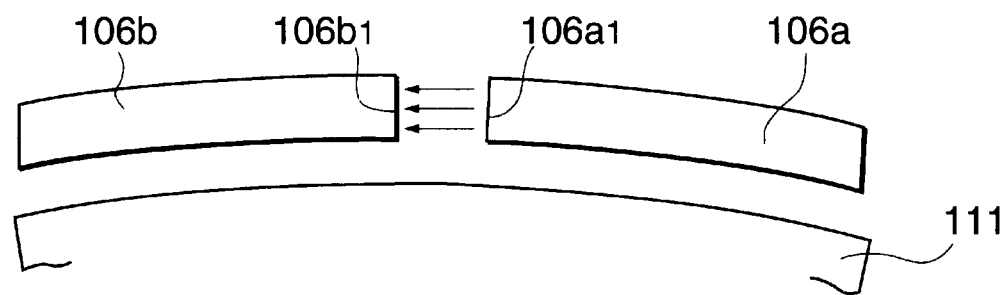
FIG. 18 is a cross-sectional view of a stator of the conventional stepper motor.
Figure 19:
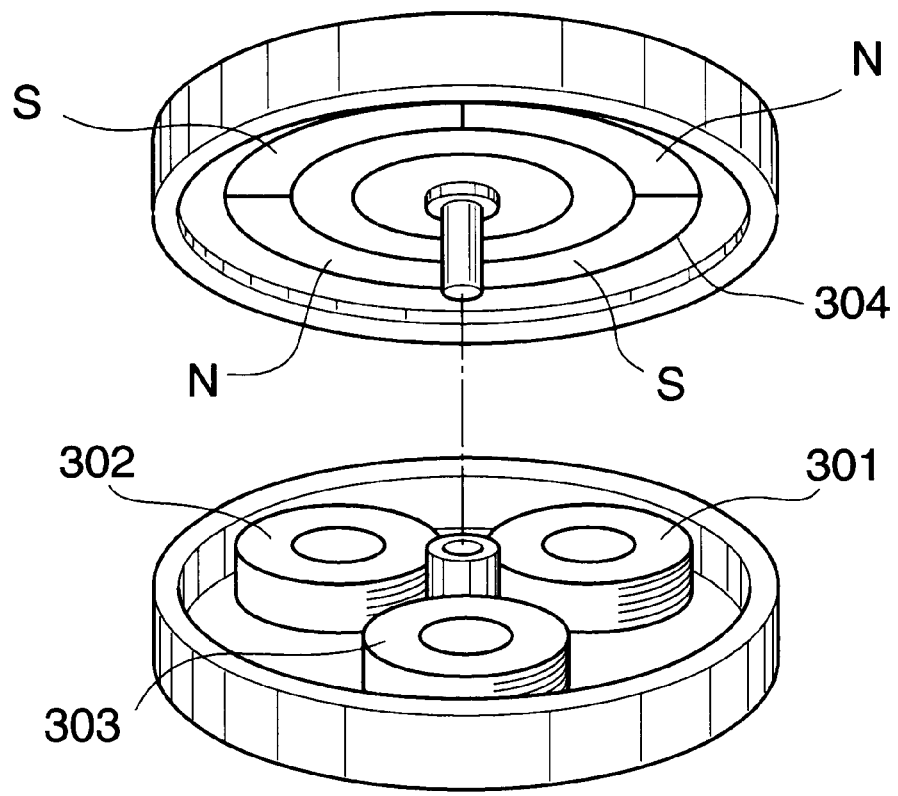
FIG. 19 is a perspective view of a conventional brushless motor.
Figure 20:
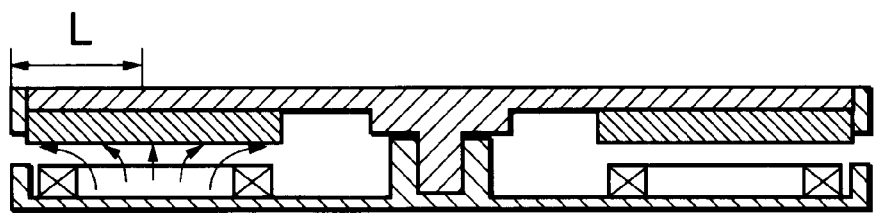
FIG. 20 is a cross-sectional view of the conventional brushless motor.

FIG. 16 shows the shutter according to the fourth embodiment in an exploded state. The shutter of the present embodiment is distinguished from the shutter of the third embodiment in that a member for controlling the diaphragm diameter is used in place of the ND filter plate 10.

Reference numeral 20 designates a diaphragm aperture plate 20. The diaphragm aperture plate 20 is formed therein with a hole 20a with which a dowel 9b of a shutter blade retainer 9 is rotatably engaged. Reference numeral 20b designates an opening smaller in diameter than the opening 9a of the shutter blade retainer 9. Except for openings, the diaphragm aperture plate 20 is formed of a nontransparent material. Similarly to the ND filter plate 10 in the third embodiment, the diaphragm aperture plate 20 has an elongate hole 20c formed therein in which is slidably engaged the dowel 11b of the output member 11. The diaphragm aperture plate 20 can move between a position for reducing the opening 9a of the shutter blade retainer 9 by covering the opening 9a and a position away from the opening 9a, in accordance with rotation of the dowel 11b of the output member 11, thereby adjusting the amount of light passing through the opening 9a. The diaphragm aperture plate 20 corresponds to light amount-adjusting means recited in claims appended hereto. The diaphragm aperture plate 20 can be formed of a nontransparent plastic or metal, so that it can be manufactured at a lower cost than the ND filter plate in the third embodiment.

Even by using diaphragm aperture plate 20, the shutter can be considered to have a photographing lens having two kinds of F values similarly to the third embodiment, so that exposure can be carried out in the first exposure state when the object field is dark, and in the second exposure state when the object field is bright, by using the single actuator. Further, the present embodiment also makes it possible to stably hold the shutter at the opening position or the closing position without the need of energizing the actuator.

In the shutters according to the third and fourth embodiments, rotation of the magnet through K degrees causes rotation of the input member 12 through 180 degrees so that the pin 11b of the output member 11 moves between two rotational positions. However, the shutter may be configured such that rotation of the magnet through K degrees can cause the input member 12 to rotate through 120 degrees, and then the pin 11b of the output member 11 will be allowed to move between three positions. In other words, it is possible to set three diaphragm values. The number of diaphragm values is mentioned by way of example but by no means intended to limit the present invention.

As described above, according to the above embodiments, the outer diameter of the driving device is determined by the outer magnetic pole pieces opposed to the outer peripheral surface of the magnet, the inner diameter of the driving device is determined by the inner magnetic pole portion opposed to the inner peripheral surface of the magnet, and the axial size or height of the driving device is determined by the axial arrangement of the coil and the magnet. As a result, by employing the magnet and the coil which are reduced in diameter and height, it is possible to design the driving device more compact in size.

Further, the magnetic flux generated between the outer magnetic pole pieces and the inner magnetic pole portion magnetized by excitation of the coil crosses the magnet arranged between the magnetic pole pieces and member, and hence effectively acts on the magnet.

Moreover, since the outer magnetic pole pieces are in the form of teeth of a hair comb which axially extend, it is possible to reduce the radial dimension of the driving device.

Further, since a single coil is used, a control circuit for energization thereof can be simplified, which contributes to reduction of manufacturing costs.

Furthermore, assuming that the angle corresponding to the angle through which each tooth of the hair comb shape of the outer magnetic piece opposed to the outer peripheral surface of the magnet circumferentially extends about the rotational axis thereof is A degrees, and the magnet has n magnetized poles, an outer diameter of D1 and an inner diameter of D2, these values are set such that the condition of $A<(248.4/n)-58.86\times(D1-D2)/(D1\times\pi)$ is satisfied. Therefore, when the coil is not energized, the center of each pole of the magnet can be stably held at a position opposed to the center of a corresponding one of the hair comb tooth-shaped outer magnetic pole pieces. (Actually, the center of each pole of the magnet is prevented from being held at this position by the cooperation of the stopper portion 5f or 5g and the projection 1b.)

Since each hair comb tooth-shaped magnetic pole piece is configured to have an axial length larger than the height of the outer peripheral surface of the magnet, a force axially exerted on the magnet by the outer magnetic pole pieces and the inner magnetic pole portion is reduced. As a result, sliding friction between the magnet and the members holding the magnet in the axial direction is reduced, which enables smooth rotation of the magnet.

Moreover, since the light amount controller includes the above driving device and the light amount control member which turns in a state linked to the magnet of the driving device to thereby control the amount of light passing through the inside of the hollow cylindrical inner magnetic pole portion, it is possible to allow light to pass through the central portion of the driving device. Further, it is also possible to construct a shutter provided with shutter blades operated in a manner interlocked with rotation of the magnet.

What is claimed is:

1. A driving device comprising:

a rotor having a cylindrical shape and having an outer peripheral surface and an inner peripheral surface, at least the outer peripheral surface being circumferentially divided into a plurality of sections magnetized so as to have alternately different poles, a coil arranged axially of said rotor and parallel thereto;

at least one outer magnetic pole portion disposed to be magnetized by said coil, said outer magnetic pole portion formed so as to extend axially of said rotor, opposed to said rotor and arranged around said rotor such that an angle corresponding to a circumferential width of said outer magnetic pole portion opposed to said rotor about a rotational axis of the rotor is equal to a predetermined angle A; and an inner magnetic pole portion disposed to be magnetized by said coil, said inner magnetic pole portion having a hollow cylindrical shape opposed to the inner peripheral surface of said rotor;

wherein the predetermined angle A is set to such a value that a rotational force acts on said rotor to return to a position in which a circumferential center of one of a plurality of magnetized sections on the outer peripheral surface of said rotor magnet is opposed to a circumferential center of said outer magnetic pole portion, when the circumferential center of one of a plurality of magnetized sections shifts from the position.

2. A driving device according to claim 1, wherein assuming that said rotor has the outer peripheral surface circumferentially divided into n sections, an outer diameter of D1 and an inner diameter of D2, the predetermined angle A is set to satisfy a condition defined by an expression:

$$A<(248.4/n)-58.86\times(D1-D2)/(D1\times\pi).$$

3. A driving device according to claim 1, wherein said outer magnetic pole portion has an axial length larger than a height of the outer peripheral surface of said rotor.

4. A driving device according to claim 1, including a rotation-preventing member for limiting a rotational angle of said rotor.

5. A driving device according to claim 1, wherein said rotor is rotatable through a rotational angle range smaller than an angle corresponding to a circumferential length of each of the plurality of sections having alternately different poles about the rotational axis of the cylindrical shape of said rotor.

6. A light amount controller comprising:
a rotor having a cylindrical shape and having an outer peripheral surface and an inner peripheral surface, at least the outer peripheral surface being circumferentially divided into a plurality of sections magnetized so as to have alternately different poles,
a coil arranged axially of said rotor and parallel thereto;
at least one outer magnetic pole portion disposed to be magnetized by said coil, said outer magnetic pole portion formed so as to extend axially of said rotor, opposed to said rotor and arranged around said rotor such that an angle corresponding to a circumferential width of said outer magnetic pole portion opposed to said rotor about a rotational axis of the rotor is equal to a predetermined angle A;
an inner magnetic pole portion disposed to be magnetized by said coil, said inner magnetic pole portion having a cylindrical shape opposed to the inner peripheral surface of said rotor; and
a light amount control member being openable and closable in a manner interlocked to said rotor to thereby control an amount of light passing through said inner magnetic pole portion;
wherein the predetermined angle A is set to such a value that a rotational force acts on said rotor to return to a position in which a circumferential center of one of a plurality of magnetized sections on the outer peripheral surface of said rotor is opposed to a circumferential center of said outer magnetic pole portion, when the circumferential center of one of a plurality of magnetized sections shifts from the position.

7. A light amount controller according to claim 6, wherein assuming that said rotor has the outer peripheral surface circumferentially divided into n sections, an outer diameter of D1 and an inner diameter of D2, the predetermined angle A is set to satisfy a condition defined by an expression:

$$A<(248.4/n)-58.86\times(D1-D2)/(D1\times\pi).$$

8. A light amount controller according to claim 6, wherein said outer magnetic pole portion has an axial length larger than a height of the outer peripheral surface of said rotor.

9. A light amount controller according to claim 6, including a rotation-preventing member for limiting a rotational angle of said rotor.

10. A light amount controller according to claim 6, wherein said rotor is rotatable through a rotational angle range smaller than an angle corresponding to a circumferential length of each of the plurality of sections having alternately different poles about the rotational axis of the cylindrical shape of said rotor.

11. A light amount controller comprising:
a rotor having a cylindrical shape and having an outer peripheral surface and an inner peripheral surface, at least the outer peripheral surface being circumferentially divided into a plurality of sections magnetized so as to have alternately different poles,
a coil arranged axially of said rotor and parallel thereto;
at least one outer magnetic pole portion disposed to be magnetized by said coil, said outer magnetic pole portion formed so as to extend axially of said rotor, opposed to said rotor and arranged around said rotor such that an angle corresponding to a circumferential width of said outer magnetic pole portion opposed to said rotor about a rotational axis of the rotor is equal to a predetermined angle A;
an inner magnetic pole portion disposed to be magnetized by said coil, said inner magnetic pole portion having a cylindrical shape opposed to the inner peripheral surface of said rotor;
a light amount control member being openable and closable in a manner interlocked to said rotor to thereby control an amount of light passing through said inner magnetic pole portion; and
a control circuit that controls said light amount control member by switching a direction of energization of said coil such that said rotor is switched between a first state in which said rotor is held at a first rotational position by attractive forces of said rotor and said outer magnetic pole portion when said coil is deenergized and a second state in which said rotor is held at a second rotational position to which said rotor has been rotated through a predetermined angle from the first state, by attraction forces of said rotor and said outer magnetic pole portion when said coil is deenergized;
wherein the predetermined angle A is set to such a value that a rotational force acts on said rotor to return to a position in which a circumferential center of one of a plurality of magnetized sections on the outer peripheral surface of said rotor is opposed to a circumferential center of said outer magnetic pole portion, when the circumferential center of one of a plurality of magnetized sections shifts from the position.

12. A light amount controller according to claim 11, wherein assuming that said rotor has the outer peripheral surface being circumferentially divided into n sections, an outer diameter of D1 and an inner diameter of D2, the predetermined angle A is set to satisfy a condition defined by an expression:

$$A<(248.4/n)-58.86\times(D1-D2)/(D1\times\pi).$$

13. A light amount controller according to claim 11, wherein said outer magnetic pole portion has an axial length larger than a height of the outer peripheral surface of said rotor.

14. A light amount controller according to claim 11, including a rotation-preventing member for limiting a rotational angle of said rotor.

15. A light amount controller according to claim 11, wherein said rotor is rotatable through a rotational angle range smaller than an angle corresponding to a circumferential length of each of the plurality of sections having alternately different poles about the rotational axis of the cylindrical shape of said rotor.

16. A shutter comprising:
a rotor having a cylindrical shape and having an outer peripheral surface and an inner peripheral surface, at least the outer peripheral surface being circumferentially divided into a plurality of sections magnetized so as to have alternately different poles,
a coil arranged axially of said rotor and parallel thereto;
an outer magnetic pole portion opposed to the outer peripheral surface of said rotor, to be magnetized by said coil;
an inner magnetic pole portion having a cylindrical shape opposed to the inner peripheral surface of said rotor, to be magnetized by said coil;
a shutter blade interlocked with said rotor for moving between a closing position for closing an optical path formed by an inside of the cylindrical shape of said inner magnetic pole portion and an opening position for holding the optical path in an open state; and light amount-adjusting device that changes an amount of light passing through the optical path in a manner interlocked with rotation of said rotor.

17. A shutter according to claim 16, wherein said light amount-adjusting device comprises a one-way clutch having an input side thereof connected to said rotor, and an output side, for transmitting only a rotational force of said rotor magnet in a predetermined direction to the output side thereof, and a light amount-adjusting member connected to the output side of said one-way clutch for entering into or retracting from the optical path in a manner interlocked to motion of the output side of said one-way clutch to thereby change the amount of light passing through the optical path.

18. A shutter according to claim 16, wherein assuming that the rotor has an outer peripheral surface circumferentially divided into n sections which are magnetized said outer magnetic pole portion opposed to the outer peripheral surface of said rotor has a shape of a plurality of tooth-shaped portions arranged circumferentially at equal intervals of an integral number of times as large as 720/n degrees around the outer peripheral surface of said rotor, each of the tooth-shaped portions of said outer magnetic pole portion opposed to the outer peripheral surface of said rotor having a circumferential width corresponding to a predetermined angle A about a rotational axis of the cylindrical shape of said rotor, the predetermined angle A being set to such a value that a rotational force acts on said rotor to return to a position in which a circumferential center of each of n magnetized sections on the outer peripheral surface of said rotor is opposed to a circumferential center of a corresponding one of the tooth-shaped portions of said outer magnetic pole portion, when the circumferential center of each of n magnetized sections shifts from the position.

19. A shutter according to claim 18, wherein assuming that said rotor has an outer diameter of $D1$, and an inner diameter of $D2$, the predetermined angle A is set to satisfy a condition defined by an expression:

$$A < (248.4/n) - 58.86 \times (D1-D2)/(D1 \times \pi).$$

20. A light amount controller according to claim 11, wherein said light amount control member has an ND filter.

21. A light amount controller according to claim 11, wherein said light amount control member is a shutter blade.

22. A light amount controller according to claim 11, wherein said light amount control member is a diaphragm aperture plate.

* * * * *

UNITED STATES PATENT AND TRADEMARK OFFICE
CERTIFICATE OF CORRECTION

PATENT NO. : 6,710,563 B2
DATED : March 23, 2004
INVENTOR(S) : Masao Mizumaki et al.

It is certified that error appears in the above-identified patent and that said Letters Patent is hereby corrected as shown below:

Column 3,
Line 5, "serve" should read -- serves --.

Column 7,
Line 27, "accompany with" should read -- accompanying --.

Column 10,
Line 3, "be also" should read -- also be --.

Column 14,
Line 10, "to a$\alpha$" should read -- to $\alpha$ --.

Column 22,
Line 37, "hollow" should be deleted.

Column 25,
Line 8, "magnet" should be deleted.

Signed and Sealed this

Tenth Day of August, 2004

JON W. DUDAS
*Acting Director of the United States Patent and Trademark Office*